United States Patent [19]

Kuragano et al.

[11] Patent Number: 4,789,931

[45] Date of Patent: Dec. 6, 1988

[54] SYSTEM FOR AUTOMATICALLY GENERATING TOOL PATH DATA FOR AUTOMATIC MACHINING CENTER

[75] Inventors: Tetsuzo Kuragano, Tokyo; Nobuo Sasaki, Kanagawa, both of Japan

[73] Assignee: Sony Corporation, Tokyo, Japan

[21] Appl. No.: 91,983

[22] Filed: Sep. 1, 1987

[30] Foreign Application Priority Data

Sep. 4, 1986 [JP] Japan .................... 61-208548

[51] Int. Cl.$^4$ ............... G06F 15/46; G05B 19/18
[52] U.S. Cl. ................. 364/474.18; 318/572; 364/474.21; 364/474.35
[58] Field of Search ............... 364/167–171, 364/191–193, 474, 475; 318/571, 572

[56] References Cited

U.S. PATENT DOCUMENTS

| | | | |
|---|---|---|---|
| 4,162,527 | 7/1979 | Kilbane et al. | 364/170 X |
| 4,283,765 | 8/1981 | Rieger | 364/521 |
| 4,445,182 | 4/1984 | Morita et al. | 364/474 |
| 4,575,791 | 3/1986 | Schwefel | 364/171 X |
| 4,608,645 | 8/1986 | Niwa et al. | 364/170 X |
| 4,609,993 | 9/1986 | Shimizu | 364/522 |
| 4,618,924 | 10/1986 | Hinds | 364/170 X |
| 4,623,977 | 11/1986 | Schrieber | 364/577 |
| 4,704,689 | 11/1987 | Asakura | 364/170 X |

*Primary Examiner*—Joseph Ruggiero
*Attorney, Agent, or Firm*—Philip M. Shaw, Jr.

[57] ABSTRACT

A system for establishing data defining a path for machining tool such as a three-axes milling machine tool. The machining tool path is established within a three-dimensional rectangular coordinate system which corresponds to a machine coordinate system for numerical control. The tool path is established along a first coordinate axis. The tool path is shifted to an adjacent path along the first coordinate axis in a second axis direction. The shifting pitch of the path corresponds to the interval of said path along the first the coordinate axis. The tool is shifted in third axis direction during travel along the path defined in the first and second axis direction.

21 Claims, 22 Drawing Sheets

FIG.11
FIG.12
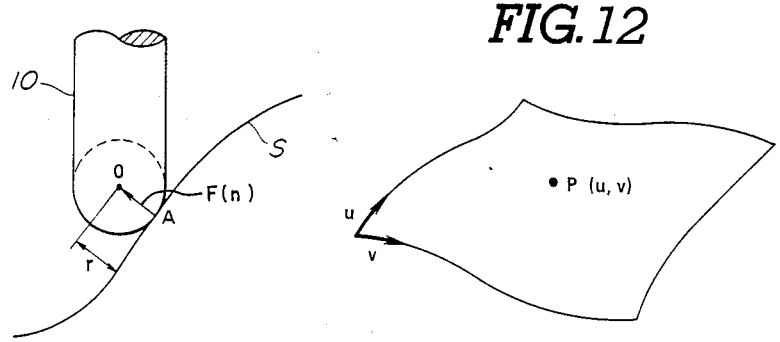
FIG.13
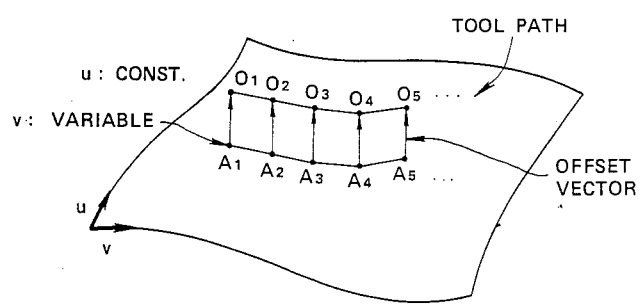
FIG.14
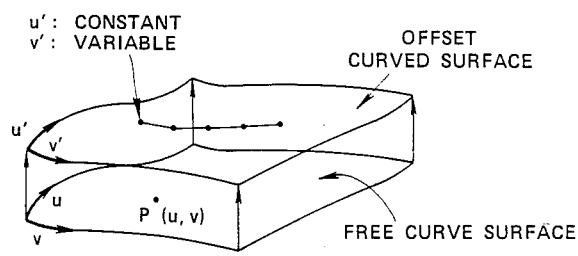

FIG. 15
(a)
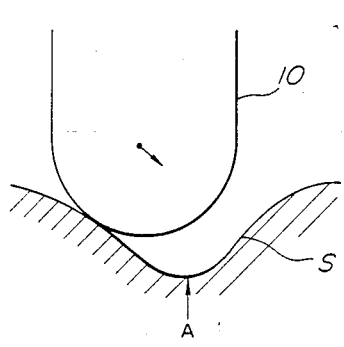
(b)
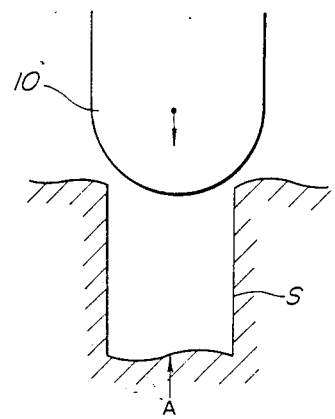
FIG. 16
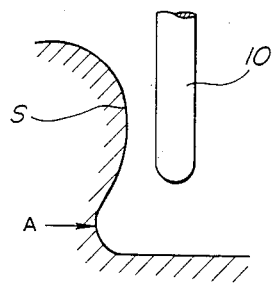

OFFSET CURVED SURFACE (a)          (b)

SYSTEM FOR AUTOMATICALLY GENERATING TOOL PATH DATA FOR AUTOMATIC MACHINING CENTER

BACKGROUND OF THE INVENTION

1. Field of the Invention

The present invention relates generally to a method and a system for generating tool path data for an automatic machining center through a three-dimensionally curved plane. More specifically, the invention relates to a method and a system for deriving numerical data for defining the automatic machining center in a numerically controlled (NC) machine.

2. Description of the Background Art

Recently, computerized automatic drafting (CAD) systems and computerized automatic machining (CAM) center systems have been developed. In addition, in order to provide for the automatic planning of the center of a three-dimensionally curved plane and for controlling an automatic machining tool, CAD/CAM systems have been developed.

Conventionally, automatically programmed tools (APT) are known for establishing tool paths. APT is programmed utilizing a general purpose automatic programming language for multi-axes surface control, which language has generally an equivalent structure to English. Such a language to be used for APT includes instructions, definitions and so forth for geometrical configurations of the work and the tool, kinematic action of the tool relative to the work, performance of the machine, tolerances, arithmetic operations and so forth. By applying a program generated by the APT language to a large computer, an NC tape can be obtained.

On the other hand, when the data description of the external dimensions and a curved surface are to be processed in the computer, a parametric description type system, such as a Bezier system or a B-Spline system is frequently used.

A fundamental and essential problem which arises in establishing the tool path, is the derivation of data in consideration of the machining accuracy and interference of the tool.

In the aforementioned APT, the user programs the tool path and, as a result, machining data is established for the curved surface. That is, the machining data cannot be automatically established from a geometrical model. Fundamentally, the high efficiency in a CAD/CAM system comes from transferring of design data in planning to machining. Therefore, APT is inefficient since designing and programming of the tool path are performed separately and irrespective of each other.

A curved surface described by parametric type data is advantageous in defining the configuration of the surface by not relying on a coordinate system. However, since the NC machines for machining curved surfaces are controlled by a coordinate system, accurate conversion from the curved surface data derived in the computer into machining data is not possible. Thus, machining accuracy cannot be obtained. Also, when the data describes the product in a parametric manner, it is technically impossible to check for interference or collision of the tool and/or tool holder prior to finishing the configuration of the work. As a result, necessary sections tend to be cut inadvertently.

There are other processes for describing polyhedrons equivalent to a curved surface, however, high machining accuracy cannot be expected unless an extraordinarily large volume of data is processed. This requires an unacceptably long period for processing the data for a practical application for an NC machine. On the other hand, in order to shorten the process period, the volume of data has to be reduced, which lowers the machining accuracy.

SUMMARY OF THE INVENTION

Therefore, it is an object of the invention to provide a method and system for establishing machining data for a curved surface, which can provide satisfactory accuracy and sufficient data processing speed.

In order to accomplish the aforementioned and other objects, the present invention provides a system for establishing a path for a machining tool, such as a three-axes milling machine tool, which path is established within a three-dimensional rectangular coordinate system corresponding to a machine coordinate system for numerical control. The tool path is established along a first coordinate axis. The tool path is shifted to an adjacent path along the first coordinate axis in a second axis direction. The shifting pitch of the path which corresponds to the interval of said path along the first coordinate axis, causes the tool to be shifted in a third axis direction during travel along the path defined in the first and second axis directions.

According to one aspect of the invention, a system for establishing a tool path for a numerically controlled machine from data describing a three-dimensionally curved surface, comprises means for forming a polyhedral surface offset from the three-dimensionally curved surface by a distance determined according to the configuration of the machining tool, the polyhedral offset surface being constituted by a plurality of surface elements, means for deriving the size of each surface element in view of a given dimensional tolerance so as to produce an error distance between the polyhedral surface to be machined and the three-dimensionally curved surface described by the data, which error distance is smaller than the dimensional tolerance. Means are provided for deriving a feed pitch of the machining tool in view of a given surface roughness tolerance so that the polyhedral surface to be machined will have a surface roughness in conformance with the given surface roughness tolerance relative to the three-dimensionally curved surface. Furthermore, means are provided for sampling coordinate data of the surface element and deriving the machining tool path on the basis of the sampled coordinate data and the machining tool feed pitch.

The system for establishing a tool path as set forth above is particularly applicable for a numerically controlled machine which comprises a numerically controlled three-axes milling machine having a ball-end mill as the machining tool. The means for deriving the ball-end mill feed pitch determines the feed pitch in such a manner that the unmachined sections between the tool paths have heights lower than or equal to a given value representative of the given surface roughness tolerance. The machining tool deriving means establishes a path in a first direction for sequentially moving the tool and a path in a second direction for shifting the tool stepwise.

The means for deriving the size of the surface elements determines the size so that the error between the radius of curvature of the curved surface and the radial dimension from the center of curvature of the curved surface to the surface element can be held smaller than or equal to a dimensional tolerance representative value. The means for forming the polyhedral offset surface operates to form a polyhedral offset surface constituted by the surface element and an equivalent to the curved surface at an orientation offset from the curved surface in a magnitude corresponding to an offset value determined according to the configuration of the tool. The means for forming the data describing the polyhedral offset surface includes means for dividing the offset surface into a plurality of segments, each of which corresponds to the surface element.

The means for establishing the machining tool path comprises means for establishing a three-dimensional coordinate system constituted by mutually perpendicularly and intersecting first, second and third axes, for establishing a plurality of planes respectively parallel to a plane defined by the first and third axes and perpendicular to the second axis, means for recording coordinate data of respective bent points of a profile line of the polyhedral offset surface on the established planes, and means for checking the overlapping of the profile lines and selecting coordinate data representative of a portion of one of the profile lines which is oriented at a higher elevation than another portion of another profile line for avoiding interference in establishing the machining tool path. The means for selecting the higher portion operates in the case of two profile lines overlapping and crossing each other, to divide the relevant plane section into a plurality of sub-sections based on the orientations of the ends of the respective profile lines and the intersection of the profile lines, and to select one of the profile line segments in each sub-section which is oriented at a higher elevation than the other, in order to establish the machining tool path while avoiding interference.

In the alternative, the means for forming the polyhedral offset surface operates to form an orthometric projection on a horizontal plane and to establish grids at given intervals. The means is further operative for recording height data of respective points on the polyhedral offset surface corresponding to respective grids relative to the horizontal plane. The means for establishing the tool path establishes it on the basis of the recorded height data. The means for establishing the machining tool path detects a plurality of points at different height positions and the same grid position to select one of the points which is oriented at the highest elevation for use in establishing the machining tool path.

According to another aspect of the invention, the system establishes a path for a machining tool in a machine which is movable along three axes in a three-dimensional rectangular coordinate system constituted by mutually perpendicular first, second and third coordinate axes. The system according to the invention comprises a first means for deriving the dimensional factors of essentially flat surface elements which, taken together, constitute a polyhedral surface equivalent to the curved surface described by the design data on the basis of dimensional tolerance data, a second means for deriving a machining factor for machining each of the surface elements on the basis of surface roughness tolerance data, a third means for establishing the polyhedral surface on the basis of the dimensional factors, a fourth means for determining a plurality of sampling points about which position data are to be sampled, the fourth means further determining the density of the sampling points on the polyhedral surface in conformance with the machining factor and identifying the orientation of each of the sampling points in a two-dimensional coordinate system defined by the first and second coordinate axes, a fifth means, cooperative with the fourth means, for sampling the coordinate data of the respective sampling points, and a sixth means for establishing a first component of the tool path on the basis of the sampled data and the position data of respective sampling points.

In the preferred construction, the fifth means samples the coordinate data of the respective sampling points relative to the third axis. The sixth means establishes the machining tool path by connecting sampling points aligned in a direction parallel to the direction of one of the first and second axes, connecting the first components at the end of the path in a direction parallel to the other of the first and second axes, and determining the magnitude of the shift of the tool relative to a reference plane defined by the first and second axes.

The system for establishing a path of a machining tool may further comprise a seventh means for avoiding interference of the machining tool. The seventh means checks the overlap of the third coordinate data at a single sampling point and selects one of the coordinate data which is oriented at the most remote position with respect to the reference surface, as a common third axis coordinate data. In this case, the fourth means forms an orthometric projection of the polyhedral surface on the reference plane to arrange the sampling points on the projection, in which the distance between the adjacent sampling points is determined to be shorter than or equal to a maximum value which is represented by the machining factor as derived on the basis of the surface roughness tolerance. The sixth means in this embodiment establishes the machining tool path by connecting adjacent sampling points having the same third axis coordinate.

Alternatively, the sixth means establishes the machining tool path by connecting sampling points aligned in a direction parallel to the direction of one of the first and second axes, connecting the first components at the end of the path in a direction parallel to the other of the first and second axes, and determining the magnitude of the shift of the tool relative to a reference plane defined by the first and second axes.

In an alternative embodiment, the fourth means establishes a plurality of sliced planes parallel to a reference plane with respect to first and second axes, the orientation of each sliced plane being identified by third axis coordinates, and the fourth means further establishes the sample points on the sliced plane. The fifth means samples the first and second axes' coordinate data of respective sampling points as the coordinate data. The fourth means samples the sampling point coordinate data as components describing a profile line of the sliced plane in combination.

This system for establishing a path of a machining tool may further comprise a seventh means for checking overlapping of a plurality of profile lines, and selecting one of the profile lines which is oriented at the most remote orientation with respect to a plane defined by the first and third axes to use as a profile line of a portion where the profile lines overlap. The seventh means may additionally check for crossing of a plurality of profile lines wherein the seventh means identifies the first and second axes coordinates of an intersection of the profile lines and selects one of the profile lines which is oriented at the most remote orientation with respect to a plane defined by the first and third axes to use as a profile line of a portion where the profile lines overlap. The seventh means establishes the machining tool path based on the first and second axes coordinate data at the ends of the selected profile lines and the first and second axes coordinate data of the intersection. The sixth means establishes a first component of the machining tool path along the profile lines and a second component connecting the profiles lines at the ends thereof.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawing:

FIG. 11 is an illustration showing an offset vector of the ball-end mill;

FIG. 12 is an illustration of a curved surface to be described by a parametric system;

FIG. 13 is an explanatory illustration showing the manner of establishing a tool path utilizing the offset vector;

FIG. 14 is an explanatory illustration showing a manner of deriving the tool path utilizing an offset curved surface;

FIGS. 15(a) and 15(b) are enlarged sections showing examples of interference between the tool and the product due to the configuration of the tool;

FIG. 16 is an illustration showing an interference occurring between the tool and the product's surface caused by the setting of the machining condition;

DESCRIPTION OF THE PREFERRED EMBODIMENT

Figure 1:
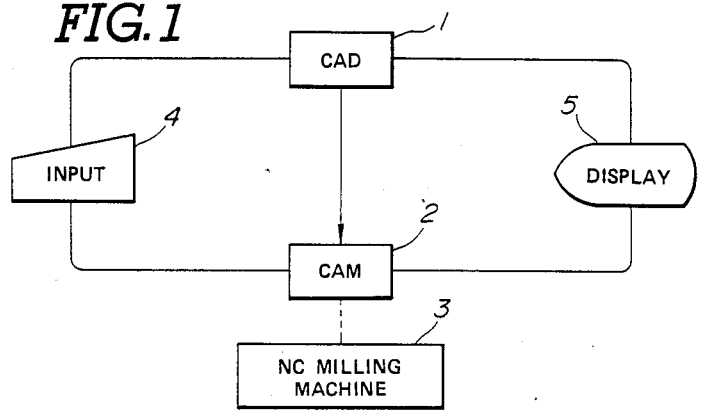
FIG. 1 is a schematic block diagram of a preferred embodiment of a CAD/CAM system according to the present invention, which includes a system for establishing tool path data for machining of a curved surface.

Referring now to the drawings, particularly to FIG. 1, the preferred embodiment of a CAD/CAM system includes a computerized automatic drawing drafting system (CAD) 1 and a computerized automatic machining (CAM) system 2 for establishing tool path data or machining data. The system 2 for establishing the tool path data will be hereafter referred to as the "tool path data establishing system". The tool path data establishing system 2 is associated with the CAD system 1 to receive data describing products, such as machin parts, castings, moldings and so forth, to be machined, which data is obtained during drafting of the drawings. Of course, the preferred embodiment of the CAD/CAM system according to the invention can handle flat planes or combinations of flat planes as designed. However, the following description will be concentrated on processing data for a path over a curved plane or surface. The curved surface data is input by an operator during the drafting of the drawings by means of the CAD system 1, through an input unit 4 while monitoring a display unit 5. Inputting and forming data which describes the curved surface by means of the CAD system is performed in a manner known per se. The data to be formed in the CAD system 1 and transferred to the CAM system 2 will hereafter be referred to as the "configuration data". The configuration data is formed and stored in the CAD system 1.

The configuration data is transferred from the CAD system 1 and is converted into machining data or data which defines a tool path in the tool path data establishing system 2. The tool path data established in the system 2 is stored in a storage medium, such as a floppy disk (not shown). The tool path data stored in the storage medium is passed to a numerically controlled (NC) milling apparatus 3, such as an NC milling machine or machining center. The milling apparatus 3 performs the machining operation according to the tool path data transferred from the tool path data establishing system.

It should be appreciated that, in practice, the CAD system 1 and the tool path establishing system 2 are respectively in form of computer-based systems. The input unit 4 to be employed in the shown embodiment of the CAD/CAM system may include a keyboard unit and a digitalizer for a user interface. The display unit 5 may comprise a CRT display.

The tool path data establishing system 2 operates according to a preferred algorithm which is established and designed for high speed processing of machining data or tool path data. In operation, the tool path data establishing system 2 adapts the curved surface configuration and surface roughness to that required and avoids interference of the tool or a plurality of tool paths with the work piece.

Figure 2:
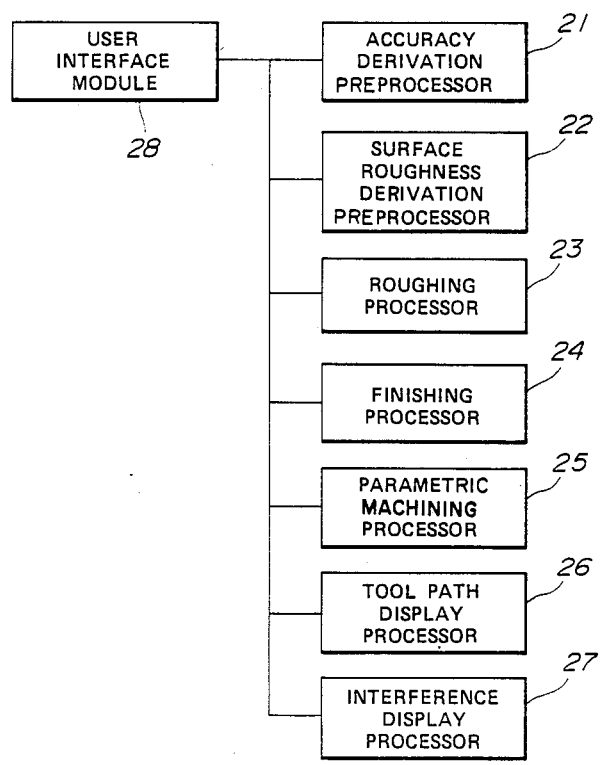
FIG. 2 is a block diagram of the tool path data establishing system of FIG. 1.

FIG. 2 shows the details of the preferred embodiment of the tool path data establishing system 2 according to the invention. Each block shown in FIG. 2 is a program module. Such program modules are designed to be processed in either a parallel manner or a sequential manner by acomputer which is not shown in a specific configuration but instead is shown in the form of function blocks represented by the program modules. Since each program module can be regarded as a digital processor for performing the desired operations, each block in FIG. 2 will be understood hereafter to be a digital processor performing the operations defined in the program. As is seen from FIG. 2, the preferred construction of the tool path data establishing system 2 comprises an accuracy derivation preprocessor 21, a surface roughness derivation preprocessor 22, a rough machining processor 23, a finishing machining processor 24, parametric machining processor 25, a tool path display processor 26, an interference indicative display processor 27, and one or more user interface modules 28.

The accuracy derivation preprocessor 21 and the surface roughness derivation preprocessor 22 are operative in an initial pre-processing stage of the tool path establishing operation. The accuracy derivation preprocessor 21 determines the division of the curved surface of the geometric model formed in the CAD system 1 in view of a tolerance setting with respect to the products to be machined. Namely, in the preferred embodiment, the curved surface of the geometric model is divided into a plurality of flat planes to form a polyhedral surface equivalent to the curved surface. Each flat plane constituting part of the polyhedral surface may be hereafter referred to as a "surface element". The size of each respective surface element, the density of the surface elements and the number of surface elements necessary to constitute a curved surface equivalent to the polyhedral surface are determined according to a set maximum tolerance. These factors for determining the surface element according to the tolerance setting will be hereafter referred to as "tolerance dependent surface element determining factor".

In the shown embodiment, each surface element is formed as a flat triangular or quadrangular plane. Such surface elements are combined to define a curved surface equivalent polyhedral surface of a machining model. By setting the surface elements according to the tolerance dependent surface element determining factor, the accuracy derivation preprocessor 21 can establish the surface element data which mathematically defines a polyhedral surface of a machining model equivalent to the curved surface in the geometric model formed in the CAD system, while still clearing the tolerance.

Therefore, the accuracy derivation preprocessor 21 can determine the configuration, size, density and number of the surface elements satisfying the tolerance dependent surface element determining factor. On the other hand, this accuracy derivation preprocessor 21 avoids excessively high accuracy of the machining data which would otherwise unnecessarily lower the machining efficiency. This means that by providing the accuracy derivation preprocessor 21, the machining operation can be operated at an optimal speed while conforming to the required machining tolerance.

As will be appreciated herefrom, according to the preferred embodiment of the CAD/CAM system, the machining tool is driven along substantially straight lines from point to point for forming a polyhedral surface equivalent to the curved surface. Such a machining operation can be performed by known three-axes NC milling machines now available on the market.

It should be noted that, in practice, the tool path to be established by the preferred embodiment of the CAD/CAM system is set as an imaginary polyhedral surface offset data magnitude corresponding to a distance from a tool center and a working end of the tool, since the tool path is defined as the path of the tool center.

The roughness derivation preprocessor 22 is operable for determining the feed pitch of the machine tool according to a required surface roughness. In general, a smaller feed pitch of the machine tool provides a smoother surface. On the other hand, a smaller feed pitch requires greater tool path data. Namely, in order to reduce the machine tool feed pitch to be $\infty$ of a certain pitch, twice as large a data volume is required. This, in turn, means that the feed pitch of the machine tool has to be set at an optimal value in view of the surface roughness which is required. Therefore, the surface roughness derivation preprocessor 22 derives a possible maximum machine tool feed pitch in view of the surface roughness in order to optimize the machining operation, and thus contains an algorithm for determining the maximum tool pitch which can satisfy the required surface roughness.

The rough machining or roughing processor 23 and the finishing machining or finishing processor 24 are operative for establishing the tool path data according to the data set in the accuracy derivation pre-processor 21 and the surface roughness derivation pre-processor 22. The rough machining processor 23 and the finishing machining processor 24 control the operation for establishing the tool paths by an identical tool path establishing algorithm. The only difference between these two processors 23 and 24 is the difference of the size of the machine tool, feed pitch and presence or absence of the finishing margin. Therefore, the rough machining processor 23 and the finishing machining processor 24 can be replaced with a common machining processor. It will be appreciated, in the shown embodiment, that the rough machining processor 23 is not required to determine the tool path in rough machining or roughing operation in relation to the tolerance setting and the required surface roughness.

The most important feature of the rough machining processor 23 and the finishing machining processor 24 is to avoid interference of the tool paths. Namely, according to the preferred embodiment of the CAD/CAM system, the rough machining processor 23 and the finishing machining processor 24 determine the tool path in the roughing and finishing operations while avoiding mutual interference of the established tool paths. Also, these processors 23 and 24 are designed for substantially high speed processing to establish the tool paths. The tool path data established in the rough machining processor 23 and the finishing machining processor 24 are transferred to the NC milling apparatus directly or via a data storage medium, such as a floppy disk, as set forth above.

The machining operation of the NC milling apparatus according to the tool path data set in the rough machining processor 23 and the finishing machining processor 24 is performed in a per se well known manner.

As will be seen from FIG. 2, in the preferred construction, the parametric machining processor 25 is additionally and optionally provided in the tool path establishing system 2. The parametric machining processor 25 is designed for directly controlling the machining operation using parametrically described original curved surface data which is established in the CAD system. As set forth above, since the parametric machine control is much quicker than the numerical control of machining, the presence of the parametric machining processor 25 may significantly improve the efficiency of the machining operation. That is, by selecting the parametric machining processor 25 for performing machining operations for the surface where no interference of the machine tool paths exists, not only the machining efficiency but also the efficiency in establishing the tool path data can be improved.

The preferred embodiment of the tool path establishing system 2 further includes a tool path display processor 26 and an interference indication display processor 27. These display processors 26 and 27 are operative to display the tool path and the interference condition of the established tool data on the visual display 5. Preferably, the display unit 5 is selected to display three-dimensional graphic data for clearly and visually showing the interference of the tool paths. The tool path establishing system 2 further includes a user interface module 28 which is designed to connect with peripheral equipment, such as an input unit, a data output unit and so forth. With this arrangement, the user can operate the processors via peripheral equipment, e.g. an input unit (keyboard) 4, and obtain the result of the process operation via the display unit 5, an X, Y plotter and so forth.

Figure 3:
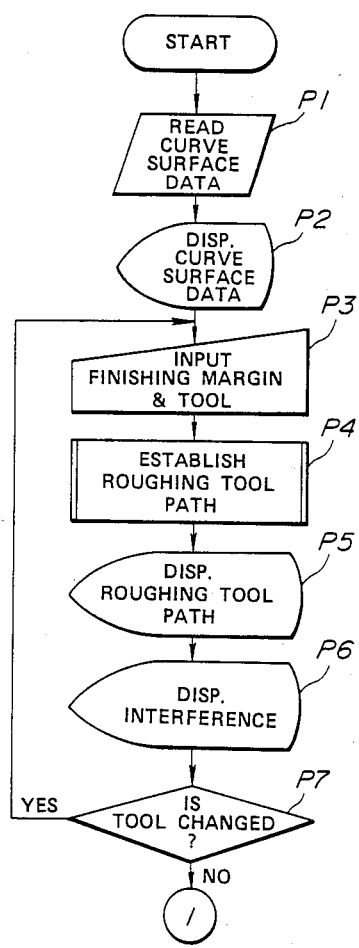
FIGS. 3 and 4 are flowcharts showing the sequence of the tool path data establishing program to be executed in the tool path data establishing system of FIG. 2.

FIG. 3 shows a main process for establishing a tool path to be performed in the tool path establishing system 2. Immediately after initiation of the operation to establish the tool path, curve data stored in the memory of the CAD system 1 or recorded in the storage medium, is read at a step P1. The read curved surface data is displayed on the display unit 5 at a step P2 so that it can be confirmed. These steps P1 and P2 constitute the input stage of the process of establishing the tool path. Thereafter, the process goes to a loop for establishing a rough machining tool path. At the initial stage of the rough machining tool path establishing loop, data are input which describe the finishing margin and tool size, i.e. the diameter of the ball-end mill, at a step P3. The input data indicative of the finishing margin and the tool size serve as parameters for establishing the rough machining tool path, at a step P4. The detailed process of establishing the rough machining tool path will be described later herein. The resultant rough machining tool path data is displayed on a display unit 5, at a step P5, and includes, in practice, the data of the rough machining tool path, the machining start point, the machining end point, and so forth. In case there is any mutual interference in the established tool paths, the interference data is also displayed on the display unit, at a step P6.

In certain cases, interference of the tool paths can be avoided by changing the tool size. In order to adapt the tool path to the changed tool size, a check is performed as to whether the tool is changed or not at a step P7. When a change of the tool size is detected at the step P7, the process returns to the step P3. Therefore, the steps P3 to P7 are again performed for redefining a tool path which is adapted to the changed tool size.

Figure 4:
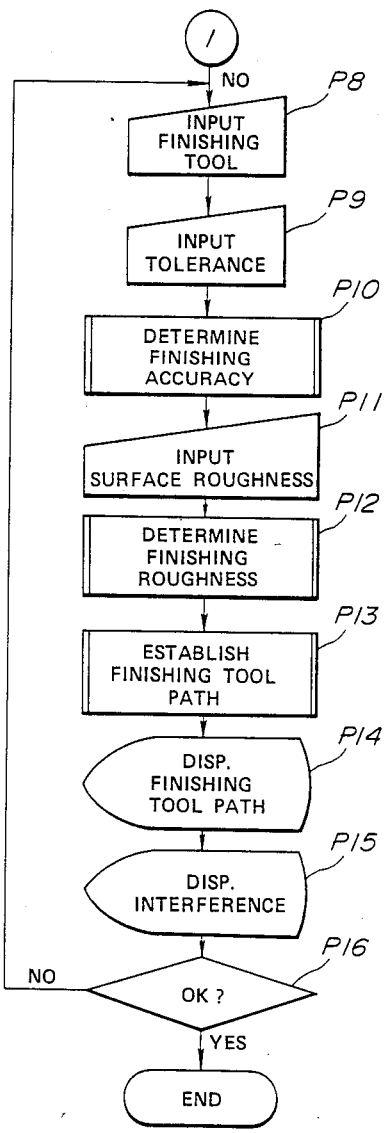

On the other hand, when the tool is not changed as checked at the step P7, the process goes to a loop shown in FIG. 4 for establishing a tool path for finishing machining. At a first step in the finishing machining tool path establishing loop, the tool size is input at a step P8. Subsequently, the required tolerance is input at a step P9. In practice, the tool path establishing system 2 includes a standard tolerance table, in which a plurality of tolerance data are set and classified as tolerance classes. Therefore, input of the required tolerance is performed by inputting identification of the tolerance class, at a step P9. After setting the tolerance data, the accuracy derivation pre-processor 21 is activated at a step P10. As set forth, the accuracy derivation pre-processor 21 derives the surface elements based on the tolerance dependent surface element derivation factor.

After deriving the surface elements and thus determining the finishing accuracy, the required surface roughness is input at a step P11. In response to the input of the required surface roughness, the surface roughness derivation pre-processor 22 becomes active to determine the tool feed pitch, at a step P12.

After the step P12, the finishing machining processor 24 is activated, at a step P13. The finishing machining processor 24, as activated, derives the tool path for the finishing machining operation. The derived tool path is displayed on the display unit 5, at a step P14. Also, the mutual interference data of the finishing machining tool path is displayed on the display unit, at a step P15. Then, interference of the tool paths is checked at a step P16. When interference of the tool paths is detected, the process returns to the step P8 to partly modify the tool path for avoiding interference. The loop of the steps P8 to P16 are repeated until tool paths having no interference are established.

When no interference of the tool paths is detected as checked at the step P16, the established tool path data, i.e. the tool path data for rough machining and the tool path data for finishing machining, are transferred to the NC milling apparatus.

Figure 5:
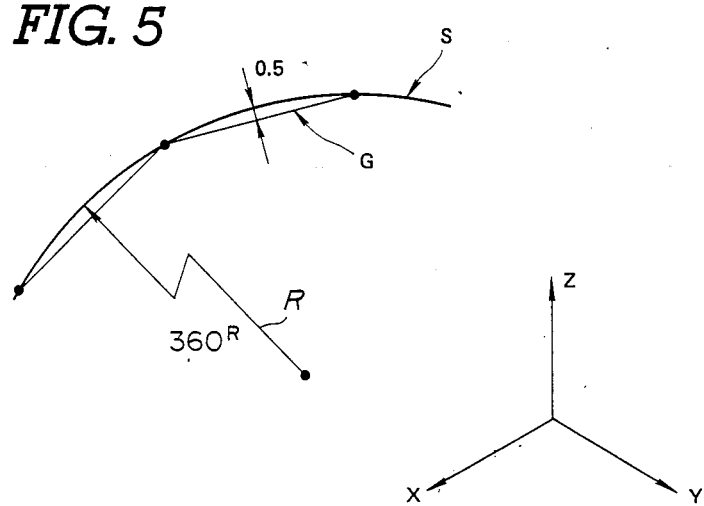
FIG. 5 is an explanatory illustration showing the error between a geometrical model and a tool path established by the tool path establishing system of FIG. 2.
Figure 6:
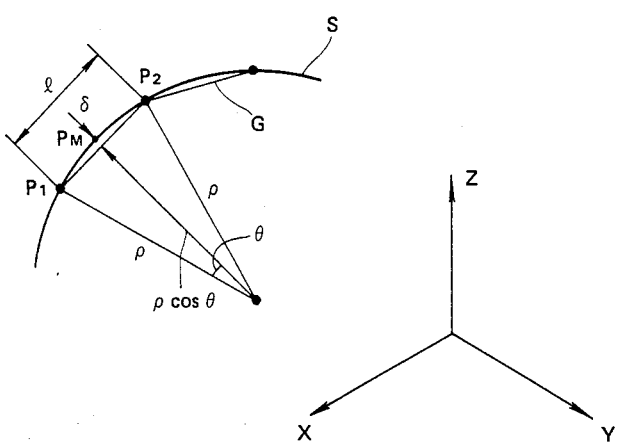
FIG. 6 is an explanatory illustration of a tool path to be established by the tool path establishing system of FIG. 2 when considering tolerance.

Operation of the accuracy derivation pre-processor 21 and the algorithm used by it will be explained herebelow with reference to FIGS. 5 and 6. FIG. 5 shows the error of the tool path relative to the geometric model formed in the CAD system 1. In the case that machining is performed by means of a three-axes controlled machining tool, the tool moves in straight lines from point to point, as illustrated by the line G in FIG. 5. As is clear from FIG. 5, since the surface S of the geometric model is described by curved surface data by the CAD system 1, the profile of the flat planes formed by the tool is different so as to contain an error distance indicated by the dimension arrows. As will be appreciated, the error becomes maximum intermediate between the points between which the tool moves. Assuming the radius of the curvature of the curved surface is constant, the maximum error between the curved surface and the machined flat plane is proportional to the distance between the machining start point and the machining end point. Namely, the greater the distance between the points the greater is the increase in the error between the curved surface S and the machined flat plane G. In other words, by making the distance between the points smaller, the error becomes smaller. However, reducing the distance between the machining start point and the machining end point requires a greater volume of tool path data and thus requires a greater memory capacity. In addition, setting a greater volume of tool path data necessarily requires a longer process time to establish the tool path data and machining.

Therefore, in view of the considerations of memory capacity and efficiency in establishing the tool path data and machining, the distance between the machining start point and the machining end point has to be determined at a possible maximum value. The maximum value is generally determined in view of the error between the curved surface and the machined flat plane. Namely, the error should not be greater than a predetermined tolerance. Therefore, the distance between the machining start point and the machining end point is to be determined so as to be a maximum value satisfying the required tolerance. By determining the distance between the machining start point and the machining end point for forming an individual flat plane as the surface element, the size, configuration and so forth of the surface element can be determined at a maximum size while satisfying the tolerance dependent surface element determining factor.

In the usual case, i.e. unless otherwise specified, the tolerance is set by standard tolerances, such as are set in the Japanese Industrial Standard (JIS) manufacturer's standard. For example, JIS B 0404-77 (Rule for dimensions in Standard Tolerance) and JIS 0408-78 (Standard Tolerance for Metal Press Products) provide relevant standard tolerances. Other examples of the standard tolerances to be set are shown in the following table 1:

TABLE 1

(Unit: mm)

| NOMINAL | TOLERANCE |
|---|---|
| R ≦ 4 | ±0.1 |
| 4 < R ≦ 16 | ±0.15 |
| 16 < R ≦ 63 | ±0.2 |
| 63 < R ≦ 250 | ±0.3 |
| 250 < R | ±0.5 |
| (R = radius of curvature) | |

Assuming the radius of the curvature of the curved surface of the geometric model of FIG. 5 is 360 mm, the tolerance according to the standard tolerance set in the table 1 becomes less than or equal to ±0.5 mm. Therefore, in deriving the size of the surface element, this required tolerance value is taken into account.

The manner of the derivation of the surface element size and the algorithm which is used to obtain the surface element size will now be discussed in more o detail with reference to FIG. 6. Assuming that the distance from the machining start point $P_1$ to the machining end point $P_2$ is $l$, and the radius of the curvature of the relevant curved surface S of the geometric model is $\rho$, then the maximum error $\delta$ obtained at the intermediate point $P_M$ between the points $P_1$ and $P_2$ can be illustrated by the following formulae:

$$\delta = \rho - \rho \cdot \cos \theta \ldots \qquad (1)$$

$$l/2 = \rho \cdot \sin \theta \ldots \qquad (2)$$

where $\theta$ is an angle defined between the radius line to point $P_M$ and either of the radius lines extending to the points $P_1$ and $P_2$.

From the foregoing equation (1), the following equation can be established:

$$\cos \theta = (\rho - \delta)/\rho \ldots \qquad (3)$$

from the equation (2) the following can be obtained:

$$\sin \theta = l/2\rho \ldots \quad (4)$$

As is well known,
$\sin \theta^2 + \cos \theta^2 = 1$, so that the following equation can be established:

$$(l/2\rho)^2 + \{(\rho - \delta)/\rho\}^2 = 1 \ldots \quad (5)$$

Therefore, $$l^2 + 4 \cdot (\rho - \delta)^2 = 4\rho^2$$

$$l^2 = 4 \cdot \delta \cdot (2\rho - \delta) \ldots \quad (6)$$

can be obtained. Here, since $\delta$ is greater than 0 and $(2\rho - \delta)$ is also greater than 0, the following equation can be established:

$$l = 2\sqrt{\delta \cdot (2\rho - \delta)} \quad (7)$$

Based on the foregoing equation (7), the distance l is determined so that the maximum error $\delta$ becomes smaller than or equal to the predetermined tolerance. Therefore, the accuracy derivation pre-processor 21 is designed to perform the foregoing arithmetic operations for determining the distance l and thereby determine the size of the surface element.

Figure 7:
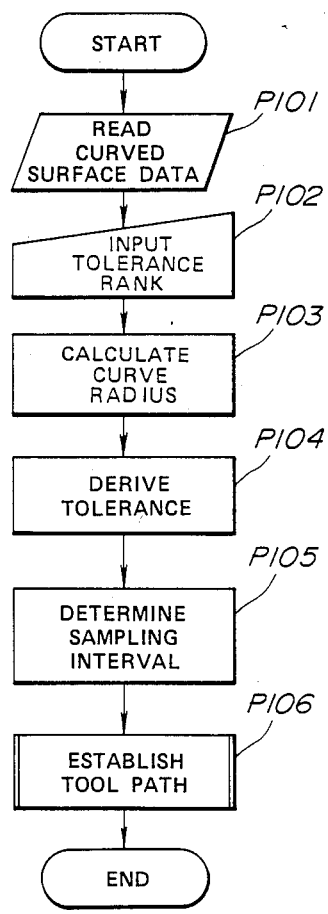
FIG. 7 is a flowchart of a program for determining finishing accuracy.

FIG. 7 is a flowchart showing the operation of the accuracy derivation system 21. The shown process of FIG. 7 is established as a sub-routine of the main program of FIG. 4 corresponding to the steps P9 and P10 of the main program. As seen from FIG. 7, immediately after entry into execution of the program of FIG. 7, the curved surface data as designed by the CAD system 1 on the geometric model, is read out, at a step P101. Then, the tolerance data is input at a step P102 through the input unit 4. In practice, the tolerance data is input in the form of tolerance rank or class as defined by nominal values shown in the foregoing table 1. The tolerance class is determined according to the property of the surface, required performance and the surface constituting material and so forth.

At a step P103, the curve radius of the curved surface of the geometric model is calculated on the basis of the read curved surface data. Based on the calculated curve radius and the input tolerance data, the required tolerance as a surface element determining factor is determined at a step P104.

In the practical embodiment, the tolerance classes are stored in an appropriate memory in the accuracy derivation pre-processor 21. Therefore, derivation of the required tolerance is made by reference to a look-up table in terms of the input tolerance data and the curve radius.

At a step P105, the size of the surface element and the number of the surface elements required to constitute a polyhedral surface equivalent to the set curved surface are determined. In the operation, the distance from the machining start point and the machining end point is determined, using the equation (7) above, in such a manner that the error at the intermediate point is smaller than or equal to the required tolerance as set at the step P104.

In deriving the distance, the foregoing equations are used for processing the data and deriving the optimum distance. In this case, the configuration of the flat plane as the surface element is in the form of a triangular or a quadrangular configuration, as set forth above. After the step P105, the process is transferred to the step P11 of the main program (FIG. 4), at a step P106.

Figure 8:
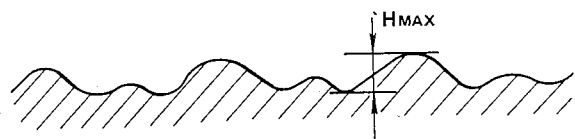
FIG. 8 is an enlarged illustration, partly in section, showing the surface roughness of a product.
Figure 9:
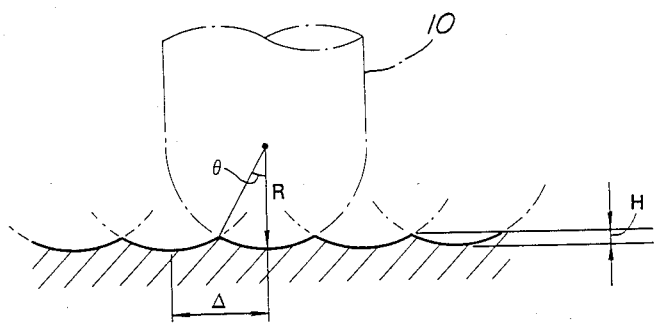
FIG. 9 is an enlarged illustration, partly in section, showing the unevenness after machining by means of a ball-end mill.

The operation of the surface roughness derivation pre-processor 22 will now be described with reference to FIGS. 8 and 9. In general, the surface roughness can be defined in various ways, such as by the magnitude of undulation, density of undulation and so forth. In the shown embodiment, it is taken to mean the roughness of the surface by a maximum undulation magnitude indicative value $H_{max}$ which is a maximum peak-to-peak height difference between an upper peak and a lower peak, as shown in FIG. 8. Therefore, in case the required surface roughness is described by ways other than the maximum undulation magnitude indicative value, conversion has to be made to determine the required maximum undulation magnitude indicative value $H_{max}$.

In the case that a ball-end mill 10, which has a semicircular working end, is used as a machining tool, the surface roughness after machining can be arithmetically obtained by calculating the possible peak-to-peak height difference H based on the radius R and an angle $\theta$ which defines the contact area at the working end of the ball-end mill. In a practical operation, the ball-end mill in machining one flat plane as the surface element, is continuously fed in one direction and is fed stepwise with a pitch $\Delta$ in a direction perpendicular to the continuous feed direction. In the example of FIG. 9, the ball-end mill is fed continuously in a direction perpendicular to the plane of the drawing and is fed stepwise in a lateral direction.

The maximum peak-to-peak height difference H on the machined surface can be calculated from the following formulae:

$$H = R - P \cdot \cos \theta \ldots \quad (8)$$

$$\Delta = 2R \cdot \sin \theta \ldots \quad (9)$$

From the equations (1) and (2), the following can be obtained:

$$\cos \theta = (R - H)/R \ldots \quad (10)$$

$$\sin \theta = \Delta/2R \ldots \quad (11)$$

From the equations (10) and (11), the following can be obtained:

$$(\Delta/2R)^2 + \{(R - H)/R\}^2 = 1$$

Therefore, $$\Delta^2 = 4H(2R - H) \ldots \quad (12)$$

can be obtained. Here, when H is greater than 0 and $(2R - H)$ is greater than 0, the equation can be modified as follows:

$$\Delta = 2\sqrt{H(2R - H)} \quad (13)$$

Since the feed pitch $\Delta$ influences the surface roughness of the surface after machining, the surface roughness required by the set roughness can be obtained by selecting the pitch appropriately. The optimum feed pitch a can be thus obtained from the foregoing equation (13). Therefore, the surface roughness derivation pre-processor 22 is operative to perform arithmetic operations utilizing the equations set forth above for determining the feed pitch of the machining tool, e.g., the ball-end mill.

It should be appreciated that, when the flat plane to be formed by machining is inclined, the tool feed pitch has to be reduced by multiplying the derived feed pitch a by a variable value depending upon the inclination angle. Namely, in the case of an inclined plane, the tool feed pitch is determined as ($\Delta \cdot \cos \theta_i$), where $\theta_i$ is an inclination angle of the inclined surface with respect to the horizontal plane.

Figure 10:
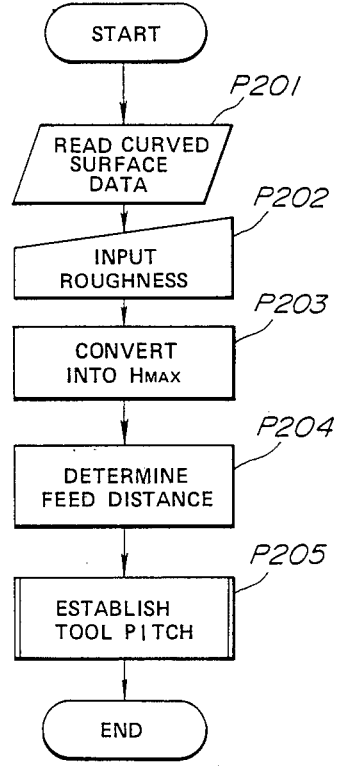
FIG. 10 is a flowchart showing a surface roughness derivation program.

FIG. 10 is a flow chart showing the process to determine the surface roughness to be performed in the surface roughness derivation pre-processor 22. The program of FIG. 10 constitutes a sub-routine of the main program of FIG. 4 and corresponds to the step P12 thereof. In execution of the program of FIG. 10, the curved surface data is read at a step P201. Thereafter, the required roughness indicative data is input through the input unit 5, at a step P202. The input required roughness indicative data is converted into a value indicative of the maximum peak-to-peak height difference value $H_{max}$, at a step P203.

At a step P204, the tool feed pitch to form the flat plane constituting the polyhedral surface equivalent to the curved surface on the geometric model, is derived based on the roughness value ($H_{max}$) derived at the step P203. The tool feed pitch $\Delta$ is chosen so as to obtain a roughness indicative value $H_{max}$ smaller than or equal to the required roughness indicative value using the equation (13). After deriving the tool feed pitch at the step P204, the process returns to the main program of FIG. 4 at a step P205.

Based on the size and number of the surface elements and the tool feed pitch derived by the accuracy derivation pre-processor 21 and the surface roughness derivation pre-processor 22, the tool path is established for each of rough machining operation and finishing machining operation. The general and fundamental algorithm of process for establishing the tool path will be described herebelow.

As set forth above, the tool paths for the rough machining process and the finishing machining process are established separately by the rough machining processor 23 and the finishing machining processor 24, respectively. The word "tool path" as it is used throughout the disclosure represents the trace of the center of the machining tool, such as a ball-end mill. However, the center of the machining tool is generally offset from the working end by a known distance. Therefore, in this sense, the tool path is established at a position offset from the surface to be machined by a magnitude corresponding to the known offset between the tool center and the working end. Therefore, in deriving the tool path, an imaginary curved surface which is offset by a distance corresponding to the known distance is formed for establishing the tool path thereon.

As can be seen from FIG. 11, in machining the curved surface S by means of the ball-end mill 10, the working end point A contacts the surface of the material to be machined. In this case, the vector AO extending through the working end point A and the center O of the ball end is a normal vector at the point A. This vector AO will be hereafter referred to as the "offset vector".

The offset vector which is herein referred to, has a starting end at the working end point where the tool contacts against the surface of the material to be machined and a terminating end at the center of the tool. In general, such a normal vector F is a function F(n) of the normal vector n. In the case of the ball-end mill, however, the offset vector F(n) can be illustrated by rn (r: radius of the ball section). Assuming offset vectors are established for every point on the curved surface, a surface offset from the relevant curved surface by a magnitude corresponding to the radius r of the ball section can be defined by the terminating ends of the offset vectors as shown in FIGS. 13 and 14. This surface which is established by the terminating ends of the offset vectors will be hereafter referred to as the "offset curved surface."

It will be easily understood that machining exactly and precisely along the curved surface can be performed by maintaining the tool center on the offset surface.

The simplest process for establishing the tool path is to take each terminating end of the offset vector as a point defining the tool path. Therefore, in this case, the tool path is defined by a train of the terminating ends of the offset vectors. Such a method is useful when the curved surface is described using the parametric method.

For example, considering the curved surface described using the parametric method, as shown in FIG. 12, the point P(x, y, z) on the curved surface can be described as a function of the parameters u and v:

$x = f_1(u, v)$ $y = f_2(u, v)$ $z = f_3(u, v)$

In such a curved surface, the points and direction of the vector can be easily obtained based on parameters u and v. Therefore, varying the parameters u and v, a line defined by a train A of points can be established, as shown in FIG. 13. This line serves as the tool path along which the machining tool, e.g. the ball-end mill, moves.

In another method, as illustrated in FIG. 14, the imaginary offset curved surface is established with respect to the curved surface on the geometric model. Points on the offset curved surface can be defined by the parametric method. For example, assume a curved surface described in the following manner:

$x = g_1(u, v) = c_{11}u^3 + c_{12}u^2 \cdot v + c_{13}u \cdot v^2 +$ $c_{14}v^3 + c_{15}u^2 + c_{16}uv + c_{17}v^2 +$ $c_{18}u + c_{19}v + c_1A$ $y = g_2(u, v) = c_{21}u^3 + c_{22}u^2 \cdot v + c_{23}u \cdot v^2 +$ $c_{24}v^3 + c_{25}u^2 + c_{26}uv + c_{27}v^2$ $c_{28}u + c_{29}v + c_2A$ $z = g_3(u, v) = c_{31}u^3 + c_{32}u^2 \cdot v + c_{33}u \cdot v^2 +$ $c_{34}v^3 + c_{35}u^2 + c_{36}uv + c_{37}v^2$ $c_{38}u + c_{39}v + c_1A$ the offset curved surface can be defined by the terminating ends $Q_1$ through $Q_5$ of the offset vectors from the points $P_1$ through $P_5$ of the curved surface on the geometric model. The tool path may be established by varying the parameters u' and v' on the offset curved surface.

The manner of deriving the tool path set forth above is performed regardless of the interference of the tool. The possible interferences occurring in the machining operation are the interference caused due to the configuration or size of the machining tool and the mutual interference of the tool path. FIGS. 15(a) and 15(b) show examples of the interference caused due to configuration and size of the machining tool 10. In the examples of FIGS. 15(a) and 15(b), in order to machine the points A on the three-dimensionally curved surfaces, the tool might contact with sections which have to be left unmachined. These differentiate the machined surface profile from that designed on the geometric model. This type of interference will be hereafter referred to as "tool related interference". FIG. 16 shows an interference caused by the setting of the tool axes. Namely, if machining of the point A in FIG. 16 is required, the machining of the point A cannot be performed without machining the overhanging portion or unless the axis or axes of the machining tool allow the tool to be inclined. This type of interference will be hereafter referred to as "tool axes related interference".

Interference of the aforementioned types can be detected by checking the orientations of the contact points of the ball-end mill on the tool path with respect to the designed curved surfae on the geometric model or on the imaginary offset surface. However, it is not practical to check all of the contact points for detecting interferences. Therefore, it was the conventional practice to manually check the interference between the tool and the surface.

Figure 17:
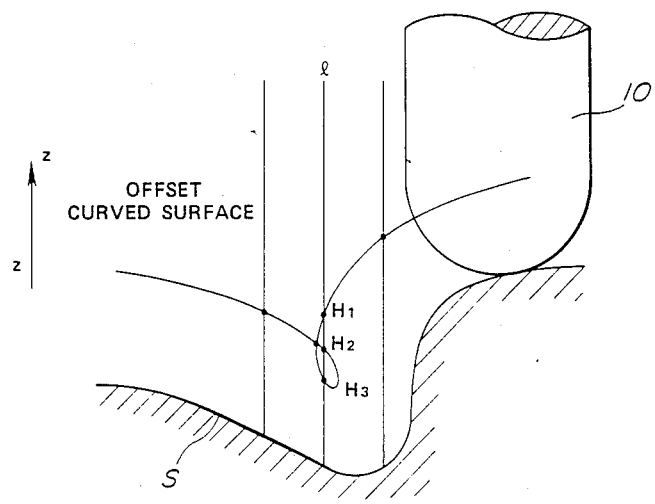
FIG. 17 is an explanatory and enlarged illustration showing a manner of avoiding such interference.

According to the preferred process of the present invention, the interference of the tool and the curved surface can be automatically checked, as illustrated in FIG. 17. Namely, in the process shown in FIG. 17, a vertical line 1 is parallel to the z-axis which is, in turn, parallel to the axis of the ball-end mill 10. Interference is checked by checking the intersection between the imaginary offset curved surface and the vertical line 1. When no interference occurs, the offset curved surface intersects with the vertical line 1 at a single point. On the other hand, when interference occurs, the offset curved surface tends to intersect with the vertical line 1 at more than one point. Therefore, checking the number of intersections between the offset curved surface and the vertical line indicates whether there is tool axes related interference.

In the shown example, the offset curved surface intersects with the vertical line 1 at three points $H_1$, $H_2$ and $H_3$. This means that the trace of the center of the ball-end mill forms a loop. In order to avoid the interference in the shown example of FIG. 17, the single intersection $H_1$, which is the highest intersection, should be taken as a point on the offset curved surface. This point $H_1$ can be described by the x, y coordinates of the vertical line 1 on a X-Y coordinate system plane. The height of the point $H_1$ is then described by the z coordinate on the line 1.

A practical process for establishing the machining tool path on the basis of the fundamental theory set forth above will now be disclosed. In general, the preferred process is constituted by the following two steps:

First step: Form the offset curved surface on the basis of the designed curved surface on the geometric model; and Second step: Derive the highest point on the offset curved point on the X-Y coordinate system plane.

As an algorithm for performing the operation in the second step, a method of identifying the orientation of the respective points on the offset curved surface on the X-Y coordinate system plane by means grids and by calculating the z coordinates of the respective grid points can be used. This method will be hereafter referred to as the "grid height method". It is also possible to take another method, in which a segment line is established on the offset curved surface, parallel to the x-axis scanning line, and the height of the segment line on the z-axis is determined. This latter method will be hereafter referred to as the "segment height method". Each of the grid height method and the segment height method will now be explained.

In the grid height method, as illustrated in FIGS. 18 through 30, points on the offset curved surface are projected onto an X-Y coordinate system plane. At the beginning of the process in the grid height method, an offset curved surface is mathematically formed which is the equivalent to the designed curved surface on the geometric model formed by the CAD system 1. In practice, the offset curved surface is formed as an equivalent polyhedral surface constituted by a plurality of quadrangular grid segments which are defined by grid lines. This polyhedron equivalent to the offset curved surface will hereafter be referred to as the "offset curve surface representative polyhedral surface." The size of each quadrangular grid segment constituting the offset curved surface representative polyhedral surface will be determined corresponding to the size and number of the polyhedral flat planes serving as the surface elements. Therefore, the interval of the intersections of the grid lines defining the quadrangular grid, which intersections serve as sampling points, is determined depending on the size of the quadrangular grid. The density of the sampling points may thus be great enough to conform to the required accuracy.

Figure 18:
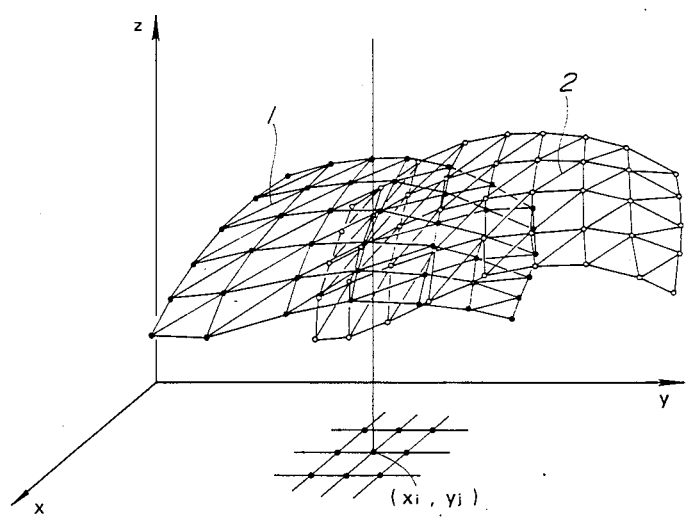
FIG. 18 is a diagrammatic illustration showing an algorithm of the grid point height system.

In order to form the offset curve surface representative polyhedron, as shown in FIG. 18, points are arranged on the imaginary offset curved surface which is the equivalent to the curved surface formed on the geometry model formed in CAD system 1, in quadrangular grid form. Offset vectors for respective points are arithmetically obtained and from them the grid points on the offset curved surface can be derived. Each of the quadrangular grid segments is separated into two triangular sections by a diagonal. As shown in FIG. 18, when interference arises, overlapping of a plurality of the offset curved surface representative polyhedral surfaces occurs.

Then, a three-dimensional rectangular coordinate system is established. In the example of FIG. 18, the z-axis of the coordinate system lies parallel to the axis of the machining tool of the NC milling machine. Next, a grid matrix is formed on the X-Y plane of the coordinate system. Each intersection of the grid on the X-Y plane is identified by x- and y-coordinates $(x_i, y_i)$. Then, the highs of the respective points on the offset curved surface representative polyhedral surface, corresponding to the points $(x_i, y_i)$ on the X-Y plane are derived. This process can be done by arithmetically calculating the intersections of the vertical lines extending through respective points ($x_i$, $y_i$) on the X-Y plane and the triangular sections of the polyhedral surface.

When mutual interference of the offset curved surface occurs, more than one intersection may appear on a single vertical line. Therefore, in order to avoid interference, a select-high operation takes place to compare the heights of the intersections and select the highest point as the point defining the tool path. In a practical operation, the offset curved surface representative polyhedral surface may be modified by taking the highest point as a point on the surfaces in common.

Figure 19:
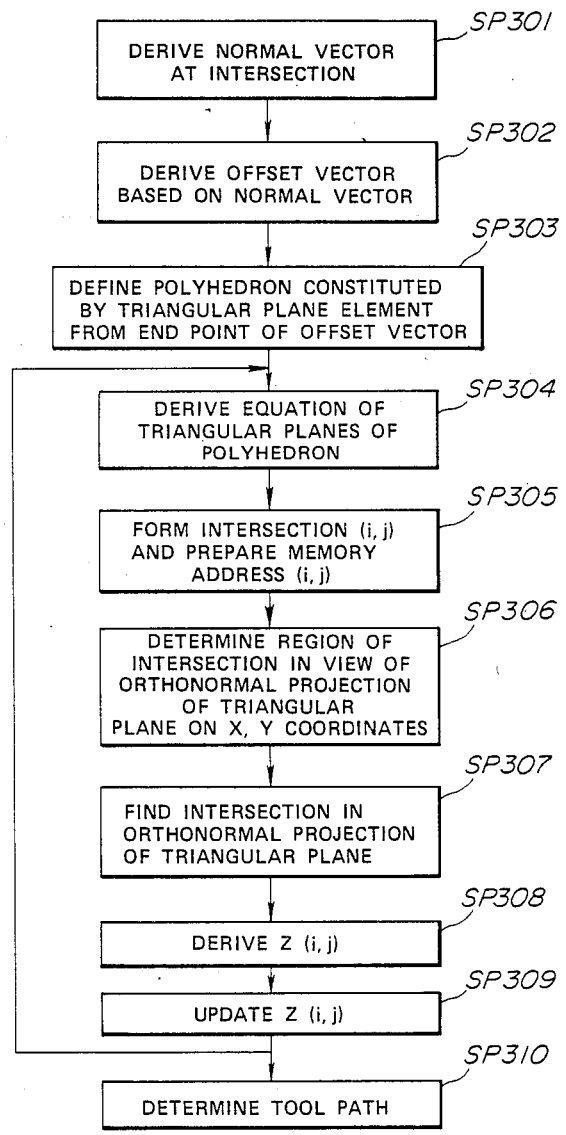
FIG. 19 is a flowchart showing a tool path establishing program according to the grid point height system.
Figure 20:
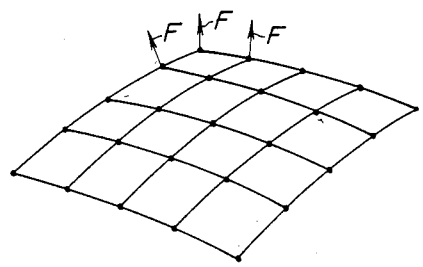
FIG. 20 is a diagrammatical illustration of a geometric curved surface to be established at the step SP301 of FIG. 19.
Figure 21:
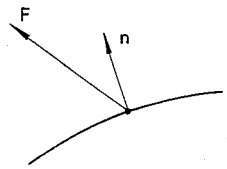
FIG. 21 shows an offset vector to be set in the step SP302 in the tool path establishing program of FIG. 19.
Figure 23:
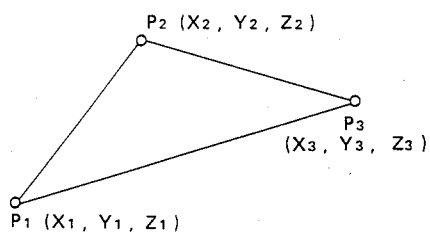
FIG. 23 is an illustration of a triangular picture element to be described by an equation established at the step SP304 in FIG. 19.

The process of the grid height method will be described herebelow with reference to FIG. 19. In the process of FIG. 19, at a first step SP301, a normal vector is derived with respect to each intersection. The example of the normal vectors established with respect to each grid is shown in FIG. 20. In the shown example, the shown piece of patch constituting the geometric model is described parametrically with 16 control points. The shown patch constitutes one of the curved surfaces formed on the geometric model. In the shown example, the patch is divided into 16 surface elements conforming to the required accuracy.

Figure 22:
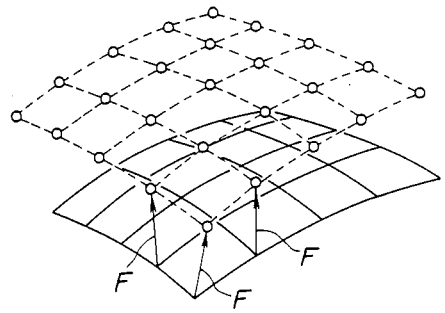
FIG. 22 is a diagrammatical illustration of an offset curved surface to be established at the step SP303 in FIG. 19.
Figure 24:
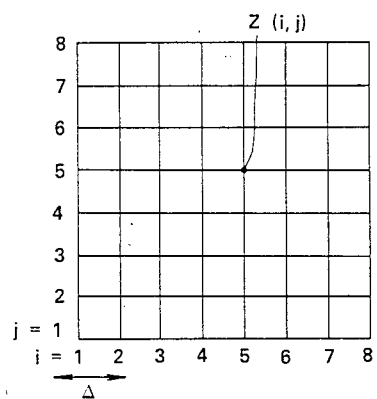
FIG. 24 is an illustration showing the orientation of the grid point on an X-Y plane.

At a step SP302, offset vectors F are established on the basis of the normal vector established at the preceding step SP301. At this time, the function F(n) of each offset vector is terminated according to the configuration and size of the machining tool. Then, at a step SP303, a plurality of quadrangular segments are established at the ends of the offset vectors F, as shown in FIG. 22. Also at the step SP303, the established quadrangular segments are divided into two triangular segments by diagonals. Therefore, the polyhedral surface is defined by a plurality of triangular segments. This polyhedral surface serves as the aforementioned offset curved surface representative polyhedral surface. For each triangular segment, coordinates ($x_i$, $y_i$ and $z_i$) of each point at the corner of each segment are arithmetically derived. In the shown example of FIG. 23, the corners $p_1$, $p_2$ and $p_3$ are described by the coordinates ($x_1$, $y_1$, $z_1$), ($x_2$, $y_2$, $z_2$) and ($x_3$, $y_3$, $z_3$). Based on these three coordinates, the following equation describing the relevant triangular segment can be established:

$$z = C_1 \cdot x + C_2 \cdot y + C_3$$

After the step SP303, a grid is formed on the X-Y coordinate system plane. Assuming the x- and y-coordinates of one grid (i, j) are ($x_{ij}$, $y_{ij}$), the x-and y-coordinates are illustrated (FIG. 24) by:

$$x_{ij} = i \cdot \Delta + x_c$$

$$y_{ij} = j \cdot \Delta + y_c$$

where ($x_c$, $y_c$) are the coordinates of a fixed point and $\Delta$ is an interval of grid lines.

Figure 25:
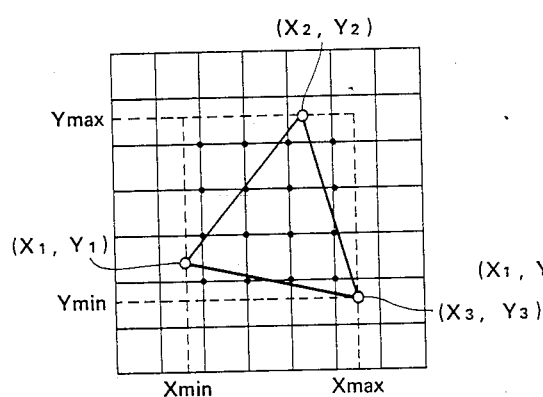
FIG. 25 is an illustration showing the relationship of the triangular picture element established at the step SP304 in FIG. 19 and the grid point arrangement on the X-Y plane established at the step SP305 in FIG. 19, which relationship is established at the step SP306 in FIG. 19.

It will be appreciated, that the interval $\Delta$ of the grid line is determined in view of the roughness tolerance set in the surface roughness derivation pre-processor 22. Namely, the grid line interval has to be smaller than or equal to the machining tool feed pitch as derived by the surface roughness derivation pre-processor. At the step SP305, memory addresses are given for storing high data of respective points on the polyhedral surface which points are projected on the X-Y plane of FIG. 24 as the grids. Then, the height data for respective grids on the polyhedral surface is stored in respectively corresponding memory addresses. After the step SP306, an orthographic projection of each triangular segment is formed on the X-Y plane, as shown in FIG. 25. Based on this orthographic projection of the triangular segment, the relevant grids on the X-Y plane corresponding to the projected triangular segment are selected. In practice, the grids within an area which is defined by extensions $x_{max}$, $x_{min}$, $y_{max}$, $y_{min}$ extending through the respective corners ($x_1$, $y_1$), ($x_2$, $y_2$) and ($x_3$, $y_3$), are selected. With respect to the relevant grids selected at the step SP306, a check is performed to find out which grids are within the triangular area as the orthographic projection of the corresponding triangular segment on the polyhedral plane, at a step SP307.

Figure 26:
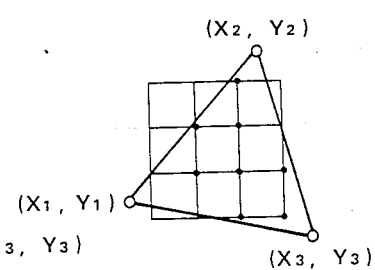
FIG. 26 is an illustration showing the manner of specifying the grid points within the triangular picture element, which specifying of the grid points is done in the step SP307 of FIG. 19.
Figure 27:
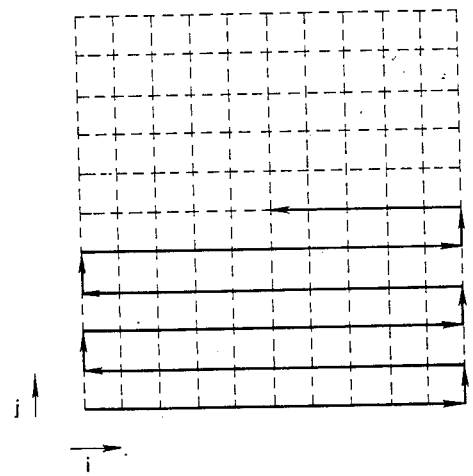
FIG. 27 is a diagrammatical illustration of a tool path established at the step SP310 of FIG. 19.

In a practical operation, the checking of whether the grid is within the triangular area will be described herebelow with reference to FIG. 26. Upon checking whether one grid is within the triangular area, at first a check is performed to determine whether the subject grid is at the same side of the corner ($x_3$, $y_3$) with respect to a line extending across the corners ($x_1$, $y_1$) and ($x_2$, $y_2$). Similar operations are performed with respect to the other two lines respectively extending across ($x_1$, $y_1$), ($x_3$, $y_3$) and ($x_2$, $y_2$), ($x_3$, $y_3$).

When the point F(x, y) is on the line extending across ($x_1$, $y_1$), ($x_2$, $y_2$), the orientation of the point F(x, y) can be described by the following equation:

$$(y - y_1) \cdot (x_2 - x_1) - (y_2 - y_1) \cdot (x - x_1) = 0$$

When the point F($x_{ij}$, $y_{ij}$) offsets from the aforementioned line, the orientation of the point can be described as:

$$(y_{ij} - y_1) \cdot (x_2 - x_1) - (y_2 - y_1) \cdot (x_{ij} - x_1) \neq 0$$

The sign of the resultant is compared with that obtained with respect to the point ($x_3$, $y_3$). When the sign of the resultant matches the sign of the value obtained with respect to ($x_3$, $y_3$), a judgment can be made that the points ($x_{ij}$, $y_{ij}$) and ($x_3$, $y_3$) are on the same side of the line extending across the points ($x_1$, $y_1$) and ($x_2$, $y_2$). A similar process should be carried out with respect to lines respectively extending across ($x_1$, $y_1$), ($x_3$, $y_3$) and ($x_2$, $y_2$), ($x_3$, $y_3$). After checking against these two lines, a final judgement is made of whether or not the point ($x_{ij}$, $y_{ij}$) is within the triangular area by determining whether or not the point is always on the same side as the remaining points ($x_1$, $y_1$), ($x_2$, $y_2$) or ($x_3$, $y_3$).

After the step SP307, the height $z_{ij}$ of the triangular segment on the polyhedral surface is derived by:

$$z_{ij} = C_1 \cdot x_{ij} + C_2 \cdot y_{ij} + C_3$$

At a step SP309, the derived height value $z_{ij}$ with respect to the point (i, j) is compared with the value set in the corresponding memory address. If the newly derived value is greater than the previously set value, the content of the memory address is replaced with the newly derived value. When the newly derived value is smaller than or equal to the previously set value, the content of the memory address is maintained without replacing it with the newly derived value.

When more than one height indicative value is derived with respect to the point identified by the x- and y-coordinates of the X-Y coordinate system plane, it means the occurrence of an interference. Therefore, in case there isalready stored a high indicative value with respect to the point identified by the x- and y-coordinates, updating of the corresponding memory address is permitted only when the fresh value is greater than the old one. This assures a select-high function to avoid interference.

The foregoing process of the steps SP304 through SP309 is repeatedly performed until the height position data for all of the grids on the X-Y coordinate system covering the polyhedral surface are sampled. When the height data for all of the sample points (grids on the X-Y coordinate system plane) are set in corresponding memory addresses at the step SP309, the process goes to a step SP310 to determine the machining tool path.

In practice, the preferred embodiment of the tool path establishing system establishes the machining tool path as a trace of the machining tool on the X-Y coordinate system plane. Namely, in the shown example of FIG. 27, the tool path is established to sequentially shift the machining tool in a scanning direction (x-axis direction as shown by arrow (i) and to stepwise shift the sequentially shifting line in a stepping direction (y-axis direction as shown by arrow (j). During movement along the path on the X-Y coordinate system plane in scanning and stepping directions, the height of the working end may be controlled according to the height data stored in the memory address corresponding to the points on the machining tool path on the X-Y coordinate system plane. This trace of the machining tool can be easily established by means of the grids, with respect to which the height data are stored in respectively corresponding memory addresses. Namely, by connecting the grids oriented on a common x-coordinate grid line, the trace in the sequential scanning direction can be obtained. The stepping trace can be derived by finding the closest grid on the next x-axis grid line.

In a practical machining operation by means of a three-axes-milling machine, the machining tool is sequentially driven in the scanning direction and stepwise fed in the stepping direction. As will be appreciated, the pitch of the stepwise feed of the machining tool is determined according to the feed pitch as derived by the surface roughness derivation pre-processor 22. During the aforementioned horizontal shifting, the height data is read out with respect to the grids on the trace of the machining tool.

With a view toward machining efficiency, the machining tool path in the scanning direction will be established in a zig-zag pattern to alternate the machining tool advancing direction at every other scanning direction trace.

Though the shown embodiment employs the machining tool trace along the x-axis direction, it should be possible to establish the path of the machining tool along the grids having the same height level. In this case, the machining tool path is established along the contour lines. This process could require the simpler operation of a height control servo mechanism of the milling machine for controlling the height of the working end. Therefore, only an uncomplicated vertical working end position controlling servo mechanism is required.

As will be appreciated herefrom, the preferred process in establishing the tool path according to the o invention can operate at substantially high speed in establishing the machining tool path.

Figure 28:
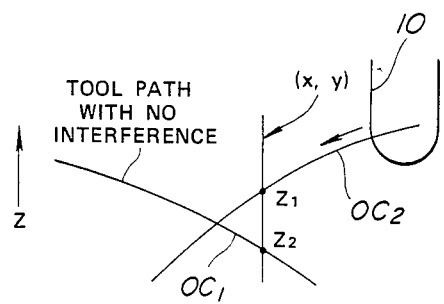
FIG. 28 is an explanatory illustration showing the manner of avoiding tool interference on the offset curved surface.
Figure 29:
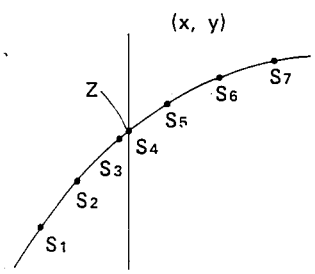
FIG. 29 is a diagrammatically illustrated side elevation of an offset polyhedron.

In general, it can be considered that avoidance of interference in establishing the machining tool can be accomplished by obtaining a curved surface overlying the offset curved surface. As shown in FIG. 28, in order to obtain the overlying curved surface, the heights $z_2$ and $z_1$ at the common x- and y-coordinates on the offset curved surfaces $OC_1$ and $OC_2$ are derived. Then, the obtained heights $z_1$ and $z_2$ are compared and the greater one is selected as the height value at the corresponding x- and y-coordinate position. However, in a conventional CAD/CAM system, the offset curved surface is parametrically described by:

$$x = \phi_1 (u, v)$$

$$y = \phi_2 (u, v)$$

$$z = \phi_3 (u, v)$$

Therefore, in order to obtain the value z based on the values x and y, repeated arithmetic operations have to be performed. That is, in order to find out the curved surface extending through the subject point, a large volume of curved surface data must be repeatedly processed using an arithmetic operation on a trial basis. Therefore the volume of required calculation becomes substantial.

In another conventional method, a polyhedral surface equivalent to the offset curved surface is established. In the example shown in FIG. 29, the polyhedral surface bends at points to form flat surfaces $S_1$, $S_2$, $S_3$, $S_4$, $S_5$, $S_6$ and $S_7$ to be the equivalent of the subject offset curved surface. The surfaces $S_1$, $S_2$, $S_3$, $S_4$, $S_5$, $S_6$ and $S_7$ can be illustrated by:

$$U_i = (x, y, z) = 0$$

By modifying the above equation, the height z can be illustrated by:

$$z = f_i (x, y).$$

Therefore, by finding that the position (x, y) lies on the surface $S_4$, the height z can be determined without repeatedly performing the arithmetic operation. However, this process still requires an operation for finding the flat plane including the subjective point.

Figure 30:
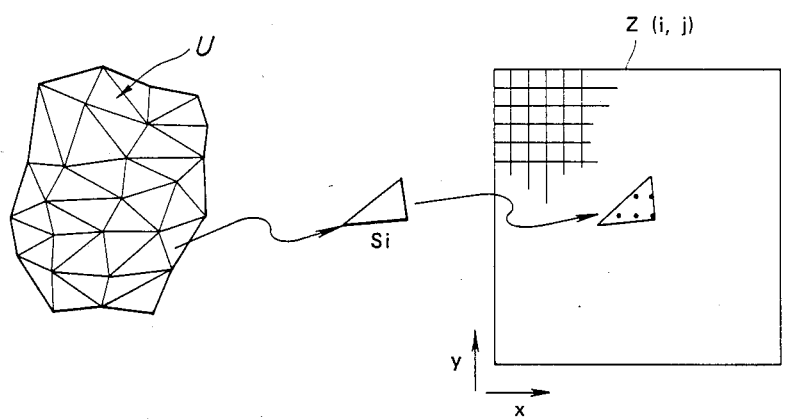
FIG. 30 is a diagrammatical illustration showing the manner of processing in the grid point height system.

However, according to the preferred embodiment of the invention set forth above, such an operation to find out the plane including the subjective point is not required. The process according to the invention is diagrammatically illustrated in FIG. 30. As shown in FIG. 30, the polyhedral surface U is constituted by a plurality of triangular segments, i. e. surface elements. For each surface element $S_i$, the height value z at the corresponding orientation on the X-Y coordinate system plane is determined. Therefore, the process according to the invention, as set forth above, does not require an operation for finding out the plane containing the subjective point from all of the planes. Therefore, the process speed in the shown embodiment of the system is simply determined by the number of the data to be sampled, and in other words, depending upon the precision and smoothness of the surface to be machined. In the preferred process, memory addresses are provided for respective grids on the X-Y coordinate system plane in sequence.

Figure 31:
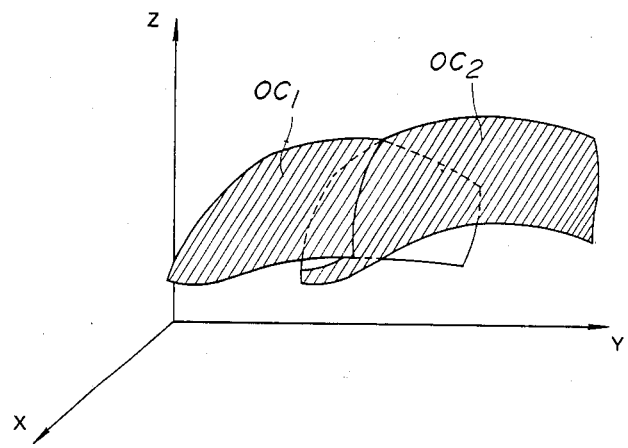
FIG. 31 is an illustration showing an offset curved surface to avoid tool interference.
Figure 32:
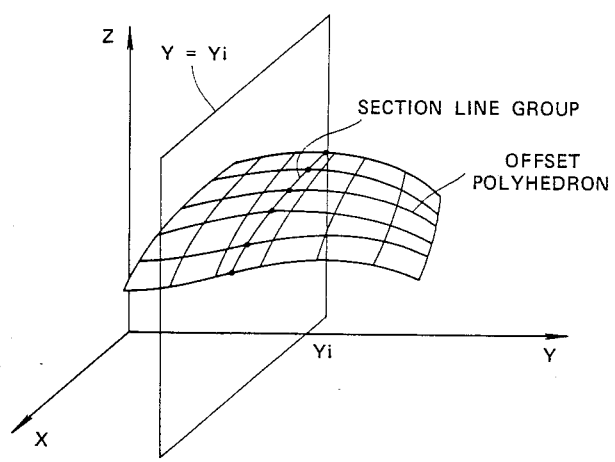
FIG. 32 is an illustration showing the theory of the segment height system.
Figure 33:
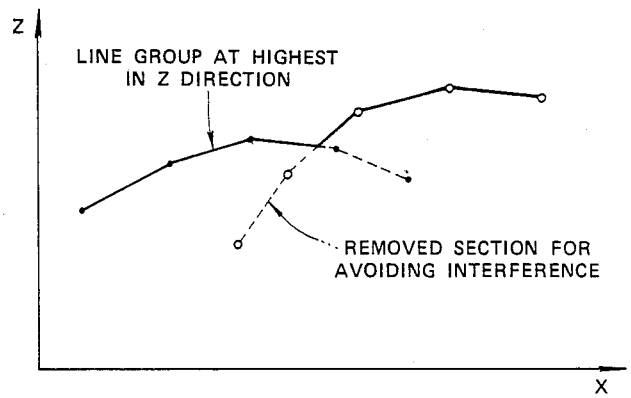
FIG. 33 is an illustration showing the manner of avoiding tool interference in the segment height method.

As set forth above, the machining tool path can also be established by the segment height method which will now be discussed in reference to FIGS. 31 to 48. Similarly to the foregoing grid height method, the segment height process also establishes the machining tool path by determining the surface overlying the offset curved surface. The preferred process establishes the machining tool path while avoiding interference of the offset curved surfaces $OC_1$ and $OC_2$ which overlap each other, as shown in FIG. 31. Namely, as shown in FIG. 32, in the preferred process for establishing the machining tool path, a line as a group of aligned points is taken as the machining tool path establishing factor. Therefore, sampling is performed with respect to each line.

In the shown embodiment of FIG. 32, lines extending parallel to the x-axis of the coordinate system are sampled. Therefore, sampling is performed merely along the y-axis. That is, sampling is performed with respect to eac sampling line having common y-coordinates with a given interval which interval will be hereafter referred to as the "sampling interval". This can be done by considering the profile of the line on a plane y which is vertically extending at a y-coordinate $y_i$. The line defining profile on the plane y can be a bent line equivalent to the curved profile of the offset curved surface. The bent line profile can be obtained by connecting the intersections of the grid lines extending in parallel to the y-axis, with straight lines.

Figure 36:
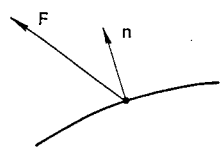
FIG. 36 shows an offset vector to be defined in the step SP402 in the program of FIG. 34.
Figure 35:
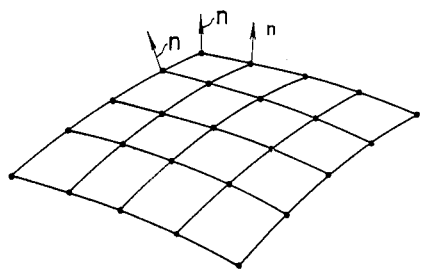
FIG. 35 is an explanatory illustration showing normals from respective grid points, which normals are determined at the step SP401.
Figure 37:
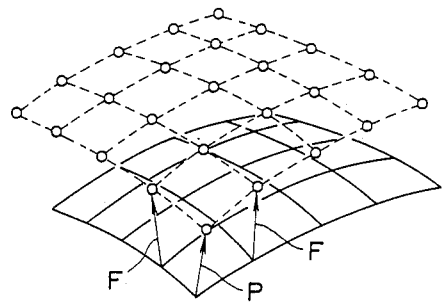
FIG. 37 is an illustration of an offset polyhedron surface to be established at the step SP403 of the program of FIG. 34.
Figure 34:
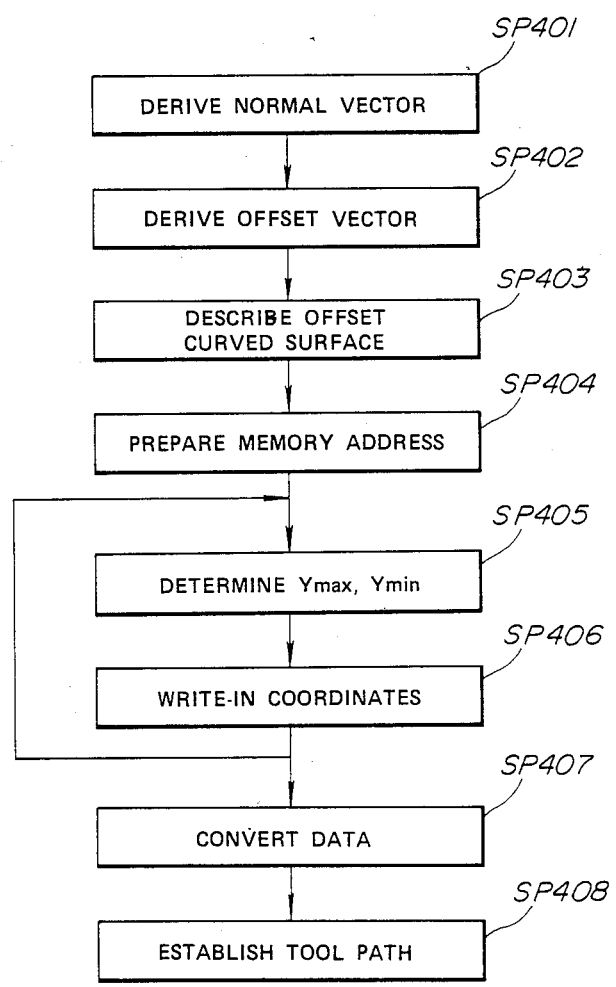
FIG. 34 is a flowchart of a tool path establishing program according the segment height system.

The process for establishing the machining tool path utilizing the segment height method will now be described with reference to FIGS. 33 to 44. FIG. 34 shows the general process for establishing the machining tool path. Similar to the foregoing process of FIG. 19, the normal vectors are formed with respect to each grid on the curved plane, at a step SP401. Based on the normal vector n established, as shown in FIG. 35, at the step SP401, offset vectors F are established, as shown in FIG. 36, at a step SP402. By means of the ends of the offset vectors established at the step SP402, grids are formed on the curved surface, as shown in FIG. 37, at a step SP403. By connecting the grids with grid lines extending along x- and y-axes, quadrangular surfaces are defined on the curved surface. As will be appreciated, each of the quadrangular surfaces is not always constituted by a flat plane. Therefore the surface constituted by the quadrangular surfaces does not exactly correspond to the offset polyhedral surface.

Figure 38:
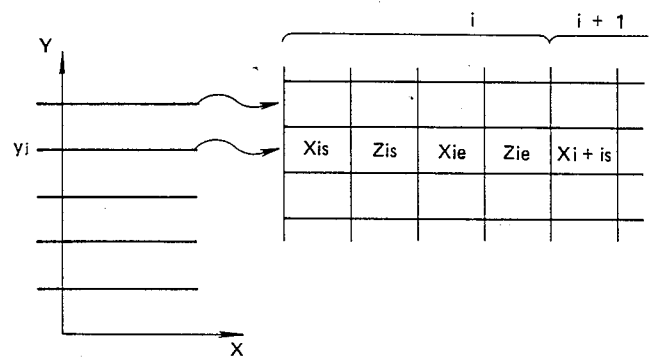
FIG. 38 is an explanatory illustration showing the memory address provided for storing the sampling data of each sampling point, which memory address is determined at the step SP404 of the program of FIG. 34.

After establishing the surface constituted by a plurality of quadrangular surfaces, memory addresses are provided for respective sampling lines, as shown in FIG. 38, at a step SP404. In practice, each memory address is given for the corresponding y-coordinate. As set forth, in the preferred embodiment, the sampling of data for the segment height method is performed with respect to lines parallel to the x-axis, each of which has common y-coordinates. Therefore, the lines are respectively identified by the x- and z-coordinates at both ends $(x_{is}, z_{is})$ and $(x_{ie}, z_{ie})$.

The intervals of mutually adjacent sampling lines are determined so as to satisfy the surface roughness tolerance as determined by the surface roughness derivation pre-processor 22. Namely, the pitch of the sampling line has to be smaller than or equal to the allowable maximum feed pitch of the machining tool as determined in the surface tolerance derivation pre-processor 22.

Figure 39:
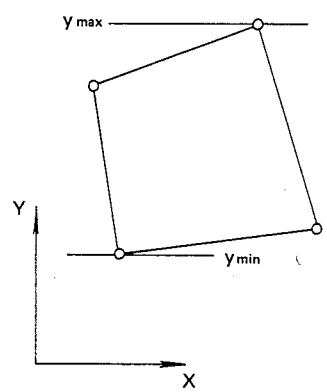
FIG. 39 is an illustration of a quadrangular picture element to be defined in the step SP405 of the program of FIG. 34.
Figure 40:
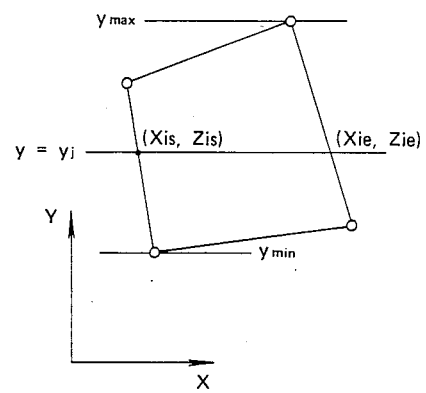
FIG. 40 is an illustration showing the manner of segment sampling to be performed at the step SP406 in the program of FIG. 34.
Figure 41:
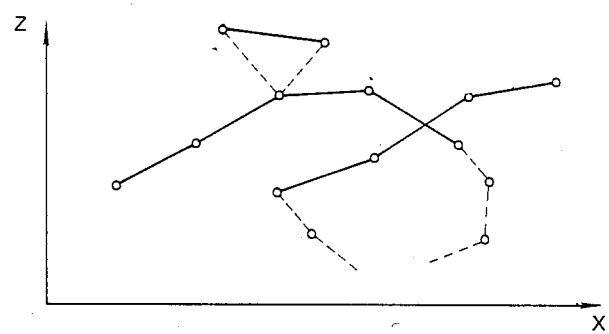
FIGS. 41 and 42 are illustrations showing the avoidance of tool interference to be performed at the step SP407 in the program of FIG. 34.
Figure 42:
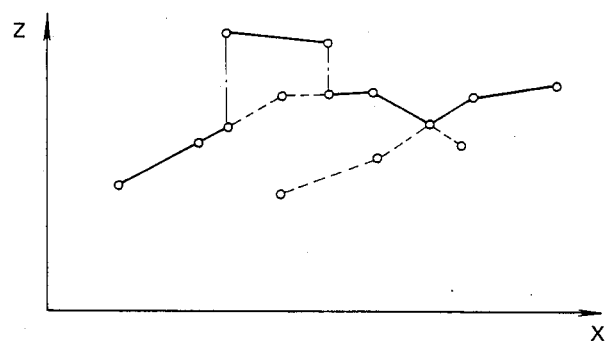

At a step SP405, maximum and minimum y-coordinates ymax and ymin are derived with respect to each quadrangular surface (FIG. 39). Then, for each quadrangular surface, the sampling lines having y-coordinates within a range defined by the maximum and minimum y-coordinates $y_{max}$ and $y_{min}$ are found, at a step SP406. With respect to each such sampling line thus found, the intersections $(x_{is}, z_{is})$ and $(x_{ie}, z_{ie})$ with the edges of the quadrangular surface are obtained, as shown in FIG. 40, at a step SP406. Thereafter, the obtained position data $(x_{is}, z_{is})$ and $(x_{ie}, z_{ie})$ are stored in corresponding memory addresses, at the step SP407. In the operation of the step SP407, a first check is made whether or not there is position data already stored in the corresponding memory address. If no data is stored, the obtained data is stored in the corresponding memory address. On the other hand, when there are already stored position data, which means that overlapping of the curved surface or surfaces has arisen (as shown in FIG. 41), the already stored data are read out and compared with the fresh position data. When the old position data is greater than the fresh data, then the content of the memory address is held unchanged and the fresh position data is ignored. When the fresh position data is greater than the old position data, the old data is replaced with the fresh data at the step SP407 so that the new data describes a line which eliminates the overlap, as shown in FIG. 42. The operations at the steps SP405 and SP407 are repeated for obtaining the position data for all of the quadrangular surfaces of the curved surface.

Figure 43:
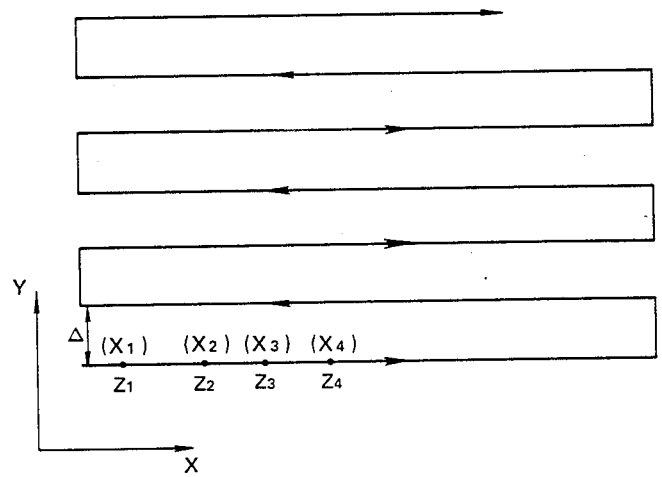
FIG. 43 is an illustration of the tool path to be established at the step SP408 in the program of FIG. 34.
Figure 44:
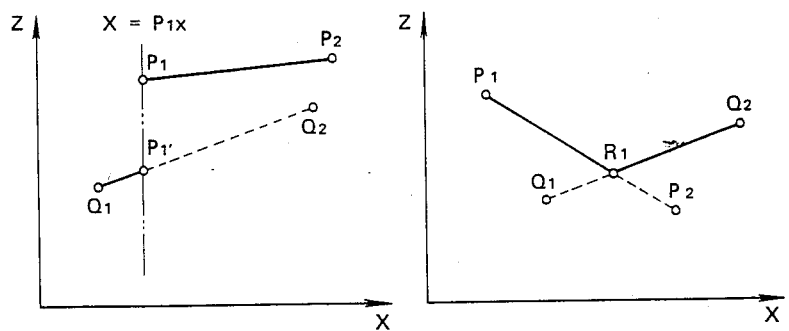
FIGS. 44(a) and 44(b) are illustrations showing examples of tool path interference.

Based on the data set in the respective memory addresses, the machining tool path is established at a step SP408. In this method, the machining tool is operated to perform scanning sequentially in the x-axis direction, with adjustment of the working end height according to the z-coordinate data. The machining tool is stepwise shifted in the y-axis direction, as shown in FIG. 43. The pitch of stepping of the line along which the sequential movement of the machining tool is performed, is determined in conformance with the machine tool feeding pitch as derived by the surface roughness derivation pre-processor 22. Therefore, the machining tool path is established by connecting the position data $(x_{is}, y_i, z_{is})$ and $(x_{ie}, y_i, z_{ie})$ on the common sampling line.

The algorithm for deriving the highest positions when overlapping of the curved surface occurs will now be described. The pattern of overlapping of the two surfaces are as illustrated in FIGS. 44(a) and 44(b) or a combination thereof. The example of FIG. 44(a) shows overlapping of the sampling lines. The example of FIG. 44(b) shows crossing of two sampling lines. In both Figures, the sections drawn by the broken lines are the sections to be omitted. In either case, the re-definition of the corresponding sampling lines becomes necessary due to removal of the overlapping sections.

Namely, in the example of FIG. 44(a), the lines $\overline{P_1 P_2}$ and $\overline{Q_1 Q_2}$ overlap each other. In this case, the point $P_1$ is oriented at a higher position than the line $\overline{Q_1 Q_2}$. Then ertical line parallel to the z-axis and extending through the point $P_1$ is established. An intersection $P_1'$ of the line $\overline{Q_1 Q_2}$ and the vertical line is obtained. The line $\overline{Q_1 P_1'}$ is thus established as a replacement of the line $\overline{Q_1 Q_2}$.

In the example of FIG. 44(b) an intersection $R_1$ of the lines $\overline{P_1 P_2}$ and $\overline{Q_1 Q_2}$ is obtained. Based on this, lines $\overline{P_1 R_1}$ and $\overline{R_1 Q_2}$ are newly established as lines avoiding the interference.

Figure 45:
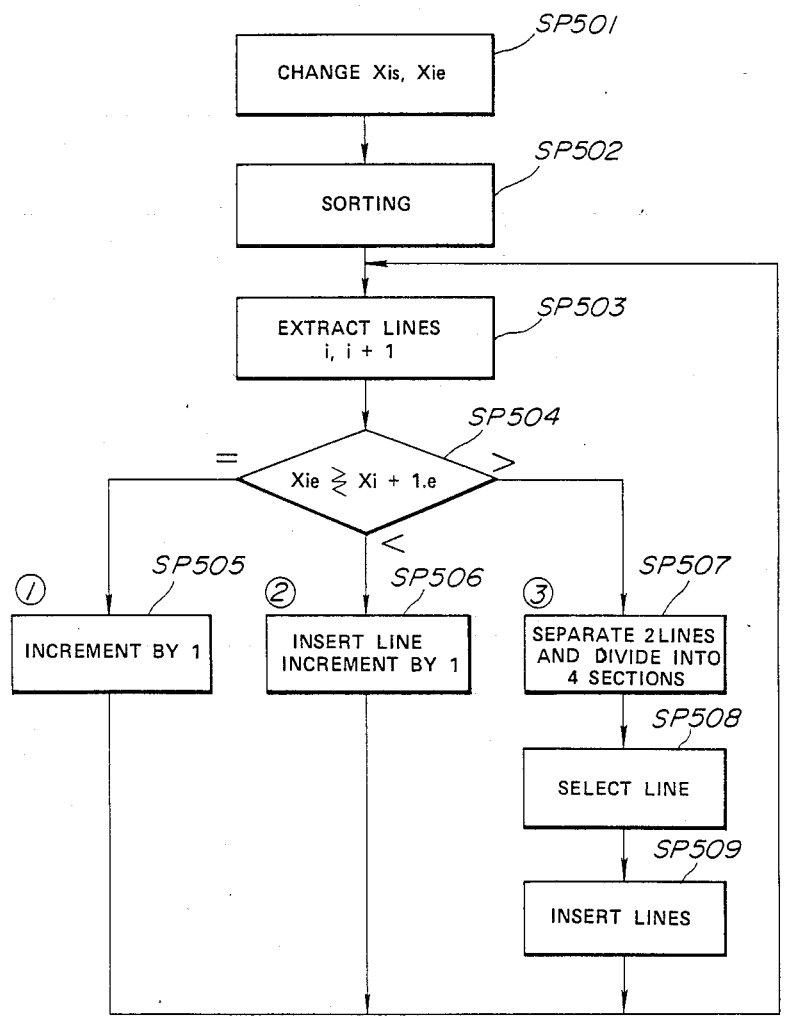
FIG. 45 is a flowchart showing the details of the process to be performed in the tool path establishing program of FIG. 34.

FIG. 45 shows a flowchart of an operation for avoiding this type of interference. As set out with respect to the step SP406 of the flowchart of FIG. 34, the position data are stored in the memory addresses for respective sampling lines. Assuming the subjective sampling line is described as $\overline{P_{is} P_{ie}}$ (i = 1, 2, . . . n), the coordinates of respective ends are:

$$P_{is} = (x_{is}, z_{is})$$

$P_{ie} = (x_{ie}, z_{ie})$.

For the convenience of an arithmetic operation, conversion is performed for lines which have an x-coordinate $x_{is}$ smaller than $x_{ie}$, at a step SP501. Therefore, the orientation of the respective lines becomes the same. At this time, since the z-coordinate values are held unchanged, the height value of respective lines will never change. This process is advantageously inserted so as to obtain uniformity of the tool path direction with respect to the x-axis. Then, the $x_{is}$ values for lines are sorted in the order of smaller value to greater value. By this sorting process, the lines are rearranged in order of magnitude of the x-coordinate values regardless of the order of sampling.

At a step SP504, line i and line (i+1) which is next to the line i, are selected. The lines i and (i+1) are respectively described as $\overline{P_{is} P_{ie}}$ and $\overline{P_{i+1,s} P_{i+1,e}}$.

Figure 46:
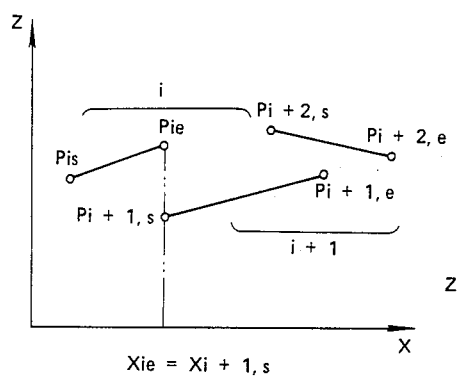
FIGS. 46 to 48 are illustrations showing examples of the relationships of a plurality of lines defining the curved surfaces.
Figure 47:
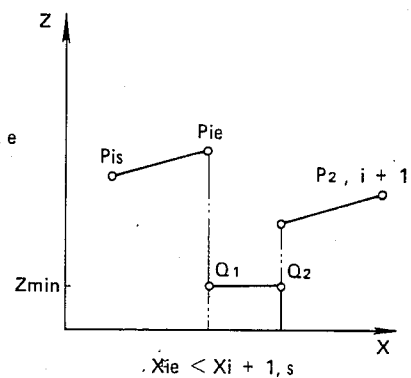

At a step SP504, the values $x_{ie}$ and $x_{i+1,e}$ are compared. When $x_{ie}$ equals to $x_{i+1,s}$, namely when the ends of both lines are at the same x-coordinate value as shown in FIG. 46, the process goes to a step SP506. At the step SP506, the value i is incremented by 1 and thereafter the process returns to the step SP503. When $x_{ie}$ is smaller than $x_{i+1,s}$, which means that the ends of the lines are separated away from each other as shown in FIG. 47, then a predetermined height for line $\overline{Q_1 Q_2}$ is inserted between the lines $\overline{P_{is} P_{ie}}$ and $\overline{P_{i+1,s} P_{i+1,e}}$ at a step SP506. Then, the newly inserted line is treated as the line (i+1). After insertion of the line, the value i is incremented by 1. After the operation in the step SP506, the process returns to the step SP503. If $x_{ie}$ is greater than $x_{i+1,s}$ as checked at the step SP504, which means that the lines overlap each other as shown in FIG. 48, then the process goes to a step SP507.

Figure 48:
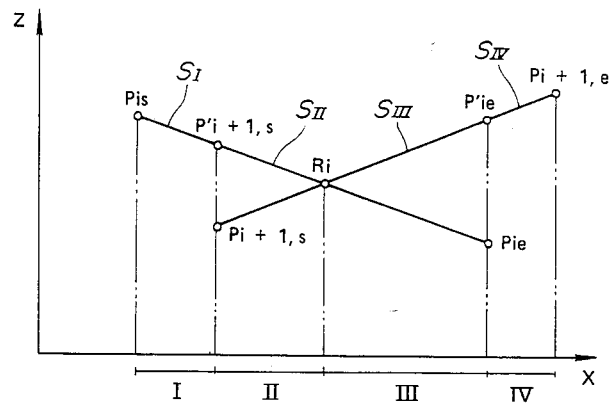

At the step SP507, the region defined by the leading end xis of the preceding line i and the trailing end $x_{i+1,e}$ of the trailing line, is separated into 4 sections, i.e. sections I, II, III and IV, at the maximum, as shown in FIG. 48. In the process in the step SP507, when $x_{is}$ is smaller than $x_{i+1,s}$, the section I exists. When the lines $\overline{P_{is}P_{ie}}$ and $\overline{P_{i+1,s} P_{i+1,e}}$ intersect with each other, the sections II and III are defined. If the lines do not intersect, the sections II and III are formed as a single section. When $x_{ie}$ is smaller than $x_{i+1,e}$, the section IV exists.

Based on the aforementioned logic, separation into the sections is performed. After this, the upper lines in the sections II and III are selected to form the lines $S_{II}$ and $S_{III}$ at a step SP508. Likewise, the lines $S_I$ and $S_{IV}$ are formed in the sections I and IV. The line data in the sections II and III are then replaced with the line data of the lines SII and SIII to form a train of lines $S_I$, $S_{II}$, $S_{III}$ and $S_{IV}$, at a step SP509.

The steps SP503 through SP509 are repeatedly performed until all of the sampling lines are processed.

Figure 49:
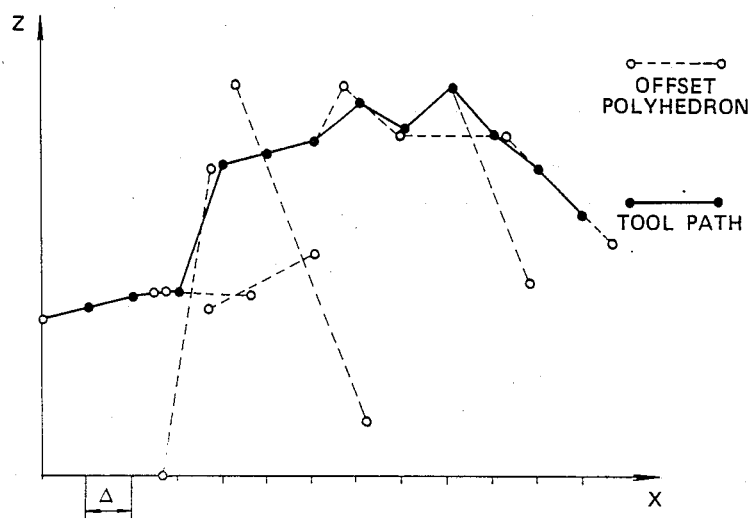
FIG. 49 is an illustration of the tool path established by the grid point height system and error contained therein.

FIG. 49 shows the machining tool path established utilizing the grid height method and the offset polyhedral surface. The tool path established by the grid height method is illustrated by a solid line and the offset polyhedral surface is illustrated by a broken line. As will be seen from FIG. 48, the machining tool path established by way of the grid height method extends substantially along the offset polyhedral surface while satisfactorily avoiding interference of the tool.

Figure 50:
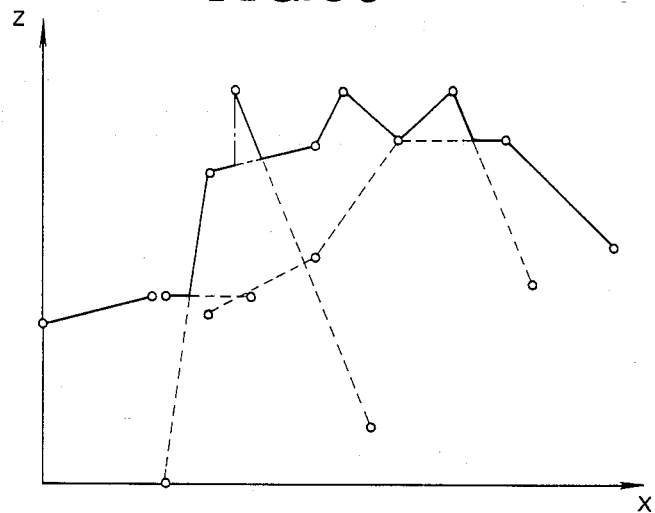
FIG. 50 is an illustration of a profile of the polyhedron to be described by the tool path established by the offset polyhedron and the segment height system.
Figure 51:
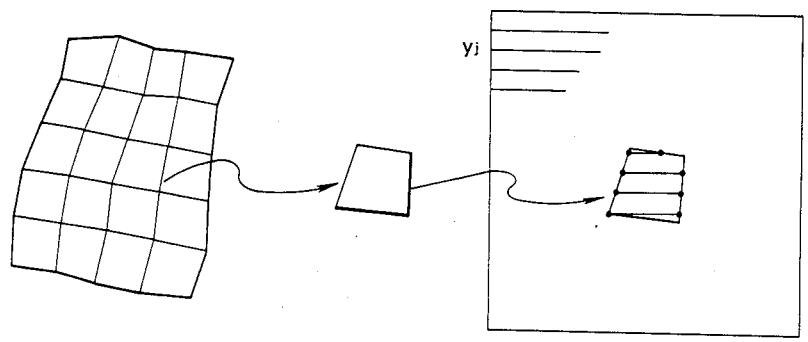
FIG. 51 is an illustration showing the manner of the processing to be performed in the segment height system.
Figure 52:
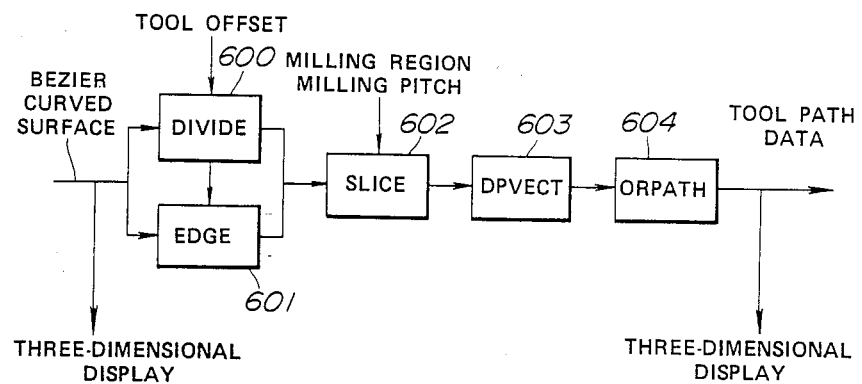
FIG. 52 is a block diagram of the tool path establishing system according to the invention.

FIG. 50 shows the machining tool path established by the segment height method in solid line. The offset polyhedral surface is illustrated by the broken line. As will be seen from FIG. 50, the machining tool path established by the segment height method will provide satisfactory precision and is successful in avoiding tool interference. In addition, this segment height method requires less volume of arithmetic operation and less memory capacity.

In either case, the present invention is efficient in establishing the machining tool path while avoiding tool interference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A system for establishing data defining a tool path for a numerically controlled machine of the type having a machining tool of a known configuration from data describing a three-dimensionally curved surface, comprising:

means for forming data representing a polyhedral surface offset from said three-dimensionally curved surface by a distance determined according to the lo configuration of the machining tool, said polyhedral offset surface being constituted by a plurality of surface elements;

means for deriving the sizes of said surface elements in view of a given dimensional tolerance so as to define an error distance between the polyhedral surface to be machined and said three-dimensionally curved surface described by said data which error distance is smaller than said dimensioal tolerance;

means for deriving a feed pitch of said machining tool in view of a given surface roughness tolerance so that said polyhedral surface to be machined will have a surface roughness in conformance with said surface roughness tolerance relative to said three-dimensionally curved surface; and means for sampling coordinate data of said surface elements, and deriving data defining said machining tool path on the basis of said sampled coordinate data and said machining tool feed pitch.

2. A system for establishing data defining a tool path for a numerically controlled machine as set forth in claim 1, wherein said numerically controlled machine comprises a numerically controlled three-axes milling machine having a ball-end mill as said machining tool and said means for deriving the feed pitch determines said feed pitch in such a manner that each unmachined sections between the tool paths has a height lower than or equal to a given value representative of said given surface roughness tolerance, and wherein said machining tool deriving means establishes a path in a first direction for sequentially moving said tool and a path in a second direction for shifting said tool stepwise.

3. A system for establishing data defining a tool path for a numerically controlled machine as set forth in claim 1, wherein said means for deriving the sizes of said surface elements determines the size of each surface element so that the error distance between the radius of curvature of said curved surface and the radial dimension from said center of curvature of said curved surface to said surface element can be held smaller than or equal to a predetermined dimensional tolerance representative value, and said means for forming said polyhedral offset surface operates to mathematically form said polyhedral offset surface constituted by said surface elements as an equivalent to said curved surface and offset from it by a distance corresponding to an offset value determined according to the configuration of said tool.

4. A system for establishing data defining a tool path for a numerically controlled machine as set forth in claim 3, wherein said means for forming said polyhedral offset surface includes means for mathematically dividing the offset surface into a plurality of segments, each of which corresponds to said surface elements, and wherein said means for establishing data defining the machining tool path comprises means for establishing a three-dimensional coordinate system constituted by mutually perpendicularly crossing first, second and third axes, for establishing a plurality of planes respectively parallel to a plane defined by said first and third axes and perpendicular to said second axis, means for recording coordinate data of respective bent points of a profile line of said polyhedral offset surface on said established planes, and means for checking overlapping of profile lines and selecting coordinate data representative of a portion of one of said profile lines which is oriented at a higher elevation than another portion of another profile line which is overlapped by the one profile line for avoiding interference in the machining tool path defined by the processed data.

5. A system for establishing data defining a tool path for a numerically controlled machine as set forth in claim 4, wherein said means for selecting the higher portion operates in the case of two profile lines overlapping and crossing each other, to mathematically divide the relevant plane section into a plurality of sub-sections based on orientations of the ends of the respective profile lines and the intersections of the profile lines, and to select one of the profile line segments in each sub-section which is oriented at a higher elevation than the other, in order to establish the machining tool path while avoiding interference.

6. A system for establishing data defining a tool path for a numerically controlled machine as set forth in claim 3, wherein said means for forming data describing said polyhedral offset surface operates to mathematically form an orthometric projection on a horizontal plane and establish grids at given intervals, said means is further operative for recording height data of points on the polyhedral offset surface corresponding to respective intersections of the grids relative to said horizontal plane, and said means for establishing data defining said tool path establishes the machining tool path on the basis of the recorded height data.

7. A system for establishing data defining a tool path for a numerically controlled machine as set forth in claim 6, wherein said means for establishing data defining said machining tool path further detects a plurality of points at different height positions and the same grid position to select the point which is oriented at the highest elevation for use in establishing said data defining the machining tool path.

8. A system for establishing electronic signal data defining a path for a machining tool which is movable along three axes in a three-dimensional rectangular coordinate system constituted by mutually perpendicular first, second and third coordinate axes, comprising:
 a first means for receiving input design data which describes a curved surface to be machined and dimensional tolerance data and wherein said first means, on the basis of the dimensional tolerance data, derives dimensional factors for a plurality of essentially flat surface elements which constitute a polyhedral surface equivalent to the curved surface described by the design data;
 a second means for receiving input surface roughness tolerance data and for deriving a machining factor for machining each of said surface elements on the basis of the surface roughness tolerance data;
 a third means for mathematically establishing said polyhedral surface on the basis of said dimensional factors;
 a fourth means for mathematically determining a plurality of sampling points on said polyhedral surface, about which position data are to be sampled, said fourth means determining the density of said sampling points on said polyhedral surface in conformance with said machining factor, and said fourth means further identifying the orientation of each of said sampling points in a two-dimensional coordinate system defined by said first and second coordinate axes;
 a fifth means, cooperative with said fourth means, for sampling coordinate data of the respective sampling points; and
 a sixth means for mathematically establishing data defining a first component of said tool path on the basis of said sampled data and the position data of the respective sampling points.

9. A system for establishing electronic signal data defining a path for a machining tool as set forth in claim 8, wherein said fifth means samples said coordinate data of the respective sampling points relative to said third axis.

10. A system for establishing electronic signal data definig a path for a machining tool as set forth in claim 9, wherein said sixth means establishes the data for defining said machining tool path by connecting aligned sampling points along a sampling line which is parallel to the direction of one of said first and second axes, connecting said first components at the end of said path in a direction parallel to the other of said first and second axes, and determining the shift in magnitude of said tool relative to a reference plane defined by said first and second axes.

11. A system for establishing electronic signal data defining a path of a machining tool as set forth in claim 10, which further comprises a seventh means for avoiding interference of said machining tool, said seventh means checking overlapping of said third axis coordinate data at a single sampling point for selecting one of said coordinate data which is oriented at the most remote position with respect to said reference surface, as a common third axis coordinate data.

12. A system for establishing electronic signal data defining a path of a machining tool as set forth in claim 11, wherein said fourth means forms an orthometric projection of said polyhedral surface on said reference plane to arrange said sampling points on said projection, in which the distance between said adjacent sampling points is determined to be shorter than or equal to a maximum value which is represented by said machining factor as derived on the basis of said surface roughness tolerance.

13. A system for establishing electronic signal data defining a path of a machining tool as set forth in claim 12, wherein said sixth means establishes said machining tool path by connecting adjacent sampling points having the same third axis coordinate.

14. A system for establishing electronic signal data defining a path for a machining tool as set forth in claim 9, wherein said sixth means further establishes said machining tool path by connecting sampling points along a plurality of sampling lines aligned in directions parallel to the direction of said first axis, connecting the ends of said sampling lines in a direction parallel to the second axis, and determining the magnitude of the shift of said tool relative to a reference plane defined by said first and second axes.

15. A system for establishing electronic signal data defining a path of a machining tool as set forth in claim 14, which further comprises a seventh means for avoiding interference of said machining tool, said seventh means checking overlapping of said third axis coordinate data at a selected sampling point for selecting the sampling point whose the third axis coordinate data is oriented at the most remote position with respect to said reference surface as the third axis coordinate data for said machining tool path.

16. A system for establishing electronic signal data defining a path of a machining tool as set forth in claim 15, wherein the fourth means mathematically forms an orthometric projection of said polyhedral surface on said reference plane to arrange said sampling points on said projection, in which the distance between said adjacent sampling points is determined to be shorter than or equal to a maximum value which is represented by said machining factor as derived on the basis of said surface roughness tolerance.

17. A system for establishing electronic signal data defining a path of a machining tool as set forth in claim 8, wherein said fourth means mathematically establishes a plurality of sliced planes parallel to a reference plane defined by said first and second axes, orientation of each sliced plane being identified by third axis coordinates, said fourth means establishes said sample points on said sliced plane, and said fifth means samples said first and second axes' coordinate data of the respective sampling points as said coordinate data.

18. A system for establishing electronic signal data defining a path of a machining tool as set forth in claim 17, wherein said fourth means samples said sampling point coordinate data as components describing a profile line of said sliced plane in combination.

19. A system for establishing electronic signal data defining a path of a machining tool as set forth in claim 18, which further comprises a seventh means for checking overlapping of a plurality of profile lines, said seventh means selecting one of said profile lines which is oriented at the most remote orientation with respect to a plane defined by said first and third axes to use as a profile line of a portion where said profile lines overlap.

20. A system for establishing a path of a machining tool as set forth in claim 18, wherein said seventh means further checks for crossing of a plurality of said profile lines, and wherein said seventh means identifies said first and second axes coordinates of an intersection of said profile lines and selects said profile line which is oriented at the most remote orientation with respect to a plane defined by said first and third axes to use as a profile line of a portion where said profile lines overlap, and said seventh means establishes said machining tool path based on the first and second axes' coordinate data at the end of said selected profile lines and said first and second axes' coordinate data of said intersection.

21. A system as set forth in claim 20, wherein said sixth means establishes a first component of said machining tool path along said profile lines and a second component connecting said profile lines at the ends thereof.

* * * * *